United States Patent
Beresnitzky et al.

(10) Patent No.: US 6,659,488 B1
(45) Date of Patent: Dec. 9, 2003

(54) TRICYCLE

(76) Inventors: Bernardo Yuri Beresnitzky, 349 Crown St., Apt. 4H, Brooklyn, NY (US) 11225; Peter Borochov, 349 Crown St., Apt. 4H, Brooklyn, NY (US) 11225

( * ) Notice: Subject to any disclaimer, the term of this patent is extended or adjusted under 35 U.S.C. 154(b) by 0 days.

(21) Appl. No.: 10/171,436

(22) Filed: Jun. 13, 2002

(51) Int. Cl.[7] .............................................. B62M 1/02
(52) U.S. Cl. ....................... 280/282; 280/261; 280/287
(58) Field of Search ................................. 280/282, 266, 280/259, 260, 261, 30, 62, 287

(56) References Cited

U.S. PATENT DOCUMENTS

| | | |
|---|---|---|
| 86,405 A | 2/1869 | Irwin |
| 236,572 A | 1/1881 | Giles |
| 246,682 A | 9/1881 | Lorenzo |
| 430,107 A | 6/1890 | Brock |
| 502,866 A | 8/1893 | Schmiedel |
| 627,680 A | 6/1899 | Brock |
| 633,746 A | 9/1899 | Anderson |
| 1,288,809 A | 12/1918 | Benson |
| 3,208,764 A | 9/1965 | Holland |
| 3,860,264 A | 1/1975 | Douglas et al. |
| 3,981,516 A * | 9/1976 | Haggkvist .................. 280/263 |
| 4,198,072 A * | 4/1980 | Hopkins ..................... 280/267 |
| 4,432,561 A * | 2/1984 | Feikema et al. ............ 280/282 |
| 4,506,902 A | 3/1985 | Mache |
| 4,572,535 A * | 2/1986 | Stewart et al. .............. 280/282 |
| 5,354,084 A | 10/1994 | Lofgren |
| 5,568,935 A * | 10/1996 | Mason ....................... 280/282 |
| 5,853,184 A * | 12/1998 | Lofgren et al. ........... 280/242.1 |
| 6,572,130 B2 * | 6/2003 | Greene et al. ............. 280/266 |

* cited by examiner

*Primary Examiner*—Kevin Hurley

(57) ABSTRACT

The present invention 10 discloses a new and novel tricycle with adjustable linkage 48, 54 for varying the drive power for either foot or hand power. Furthermore, the linkage 44, 52 can also be used to vary the wheelbase. Moving the front wheel 14 toward the rear wheels 22 provides for a tighter turning radius. Moving the front wheel 14 away from the rear wheels 22 provides for greater stability at high speed. In addition the linkage 48, 54 provides for the selective placement along a horizontal and/or vertical plane relative to the seat 24 allowing persons of varying size to comfortably position the pedal assembly 16. Additionally, the present invention 10 has a cantilevered seat frame 30 with the seat 24 at one distal end and the other end forming a yoke 32 connected to the front wheel steering pivot column 34 whereby left movement of the seat 24 results in a right turn of the front wheel 14 and a right movement of the seat 24 results in a left turn of the front wheel 14.

8 Claims, 22 Drawing Sheets

TRICYCLE

BACKGROUND OF THE INVENTION

1. Field of the Invention

The present invention relates generally to human powered vehicles and, more specifically, to a new and novel tricycle with adjustable linkage for varying the drive power for either foot or hand power. Furthermore the linkage can also be used to vary the wheelbase. Moving the front wheel toward the rear wheels provides for a tighter turning radius. Moving the front wheel away from the rear axle provides for greater stability at high speed. In addition the linkage provides for the selective placement along a horizontal and/or vertical plane relative the seat allowing persons of varying size to comfortably position the drive mechanism.

Additionally, the present invention has a cantilevered seat with the seat at one distal end and the other forming a yoke connected to the front wheel steering column whereby left movement of the seat results in a right turn of the front wheel and a right movement of the seat results in a left turn of the front wheel.

2. Description of the Prior Art

There are other human powered vehicle devices designed having one or more components of the present invention. Typical of these is U.S. Pat. No. 86,405 issued to Irwin on Feb. 2, 1869.

Another patent was issued to Giles on Jan. 11, 1881 as U.S. Pat. No. 236,572. Yet another U.S. Pat. No. 246,682 was issued to Lorenzo on Sep. 6, 1881 and still yet another was issued on Jun. 17, 1890 to Brock as U.S. Pat. No. 430,107.

Another patent was issued to Schmiedel on Aug. 8, 1893 as U.S. Pat. No. 502,866. Yet another U.S. Pat. No. 627,680 was issued to Brock on Jun. 27, 1899. Another was issued to Anderson on Sep. 26, 1899 as U.S. Pat. No. 633,746 and still yet another was issued on Dec. 24, 1918 to Benson as U.S. Pat. No. 1,288,809.

Another patent was issued to Holland on Sep. 28, 1965 as U.S. Pat. No. 3,208,764. Yet another U.S. Pat. No. 4,506,902 was issued to Maebe on Mar. 26, 1985. Another was issued to Douglas et al on Jan. 14, 1975 as U.S. Pat. No. 3,860,264 and still yet another was issued on Oct. 11, 1994 to Lofgren et al. as U.S. Pat. No. 5,354,084.

The invention is a three-wheel velocipede where the rider's seat is connected with the guide frame so as to swivel or swing laterally therewith. A pivot bolt forms the direct connection and turns in a socket on the front end of the connecting brace. To the upper end on the socket is secured a transverse stationary hand-support.

The invention is a velocipede having more than two wheels; and it consists, principally, in the clutch coupling on one of the driving wheels; in a seat capable of vibrating in a vertical plane transverse to the line of advance and steering-gear connected therewith, so that the vehicle may be steered by swaying the body toward one side or the other; in a hollow reach to house and protect the steering shaft; in the projecting crank-arm of the steering-shaft; in the projecting crank-arm of the steering shaft with pendant crank ends, the weight whereof tends to keep the steering wheel in median position.

The invention is a shaft having a large drive wheel and two small ratchet-wheels rigidly secured thereto, and provided with recesses at its ends, into which the axle-arms are secured.

The invention relates to three-wheel velocipedes or tricycles and consists of devices to permit of adjusting the middle or steering wheel through the medium of the tricycle seat by the body of the rider, leaving both the hands and the feet free, as for driving the vehicle. Also, in connection with said steering devices, of a driving mechanism having one or more pairs of vertical levers united by a horizontal bar or bars, whereby a support is afforded to the body of the rider in the act of steering by the seat.

The invention is a bicycle frame, a steering wheel, a laterally swinging saddle frame suspended from the bicycle frame and a connection between the steering wheel and the saddle frame, whereby the wheel is operated by the swinging of the said saddle frame.

The present invention is partly related to improvements for turning the steering-wheel of a bicycle by connection with a vertically pivoted seat, and partly to the means for pivoting the steering-wheel upon the end of a fixed axle, partly to a toggle connection between the pedal and the driving, partly to a double-fulcrumed hand-lever connected to the driving crank, and partly to a frame built upon a single horizontal frame-bar for supporting the said mechanism effectively. The invention consists in attaching the front wheel steering fork to the saddle-post and so connecting the former with the front wheel that the said wheel may be readily swiveled by the movement of the rider upon the saddle.

The invention is a bicycle embodying in its organization a frame composed of rigid tubes, a driving wheel mounted in the rigid frame, a steering wheel mounted in a steering fork pivoted within one of the oblique tubes of the frame, and a saddle rigidly connected with the pivoted shank of the steering fork, the point of contact between the steering wheel and the ground being substantially in line with the shank of the steering fork.

The invention relates to improvements in a combined velocipede and go-cart. An object of the invention is to provide a velocipede for small children which is particularly adapted for indoor use and so arranged that it can be easily propelled by a child and steered by moving the seat.

The invention relates to a four wheeled cart having a novel steering arrangement whereby the vehicle is steered by twisting the body of the user in a rotatable seat, thereby providing a cart in which steering is accomplished without the use of the hands of the user.

A velocipede having a front wheel assembly carrying a front wheel and a rear wheel assembly carrying a pair of co-axial rear wheels. The wheel assemblies are pivotally connected approximately midway between the axis of rotation of the front wheel and the axis of rotation of the pair of rear wheels by a pivotal coupling member that is rotatable around an axis that lies in the longitudinal plane of the velocipede at an angle of 20 degrees from the vertical. A spring within the pivotal coupling member limits the relative displacement of the wheel assemblies to 25 degrees on either side of the vehicle's normal forward position in response to sideways tilting of the front wheel assembly by means of a weight shifting or leaning motion of the rider of the velocipede.

A three-wheeled vehicle having a front body member carrying front wheel seat, hand pedals and leg supports pivotally connected to a rear body member carrying the rear wheels and handlebar. The front body member includes a seat for the operator and pedals to be operated by the rider's hands. The seat, pedals, front wheel and leg supports are maintained in a fixed relationship whereby pivoting of the front frame portion simultaneously pivots the seat, pedals, drive line and front wheel to maintain said fixed relationship while turning and supplying power to the front wheel. A stabilizing dampener between front and rear frame sections provides smooth steering and inhibits undesired, inadvertent, side to side movement of the rider's body and thereby repetitive back and forth turning of the vehicle.

A three-wheeled vehicle having a front body member carrying front wheel seat, hand pedals and leg supports pivotally connected to a rear body member carrying the rear wheels and handlebar. The front body member includes a seat for the operator and pedals to be operated by the rider's hands. The seat, pedals, front wheel and leg supports are maintained in a fixed relationship whereby pivoting of the front frame portion simultaneously pivots the seat, pedals, drive line and front wheel to maintain said fixed relationship while turning and supplying power to the front wheel. A stabilizing dampener between front and rear frame sections provides smooth steering and inhibits undesired, inadvertent, side to side movement of the rider's body and thereby repetitive back and forth turning of the vehicle.

While these human powered vehicles may be suitable for the purposes for which they were designed, they would not be as suitable for the purposes of the present invention, as hereinafter described.

SUMMARY OF THE PRESENT INVENTION

The present invention discloses a new and novel tricycle with adjustable linkage for varying the drive power for either foot or hand power. Furthermore, the linkage can also be used to vary the wheelbase. Moving the front wheel toward the rear wheels provides for a tighter turning radius. Moving the front wheel away from the rear axle provides for greater stability at high speed. In addition the linkage provides for the selective placement along a horizontal and/or vertical plane relative to the seat allowing persons of varying size to comfortably position the drive mechanism. Additionally, the present invention has a cantilevered seat with the seat at one distal end and the other end forming a yoke connected to the front wheel steering pivot column whereby left movement of the seat results in a right turn of the front wheel and a right movement of the seat results in a left turn of the front wheel.

A primary object of the present invention is to provide a human powered vehicle having linkage means for varying the position of the guide wheel and drive mechanism.

Another object of the present invention is to provide a human powered vehicle having means for adjusting the back rest of the seat in a vertical movement.

Yet another object of the present invention is to provide a human powered vehicle having means for adjusting the inclination of the back rest of the seat.

Still yet another object of the present invention is to provide a human powered vehicle where the drive mechanism can be positioned whereby the rider can use their hands to power the vehicle.

Another object of the present invention is to provide a human powered vehicle where the guide wheel can be move closer to or further from the rear axle.

Yet another object of the present invention is to provide a human powered vehicle having a cantilevered seat forming a yoke for the drive column at one distal end.

Still yet another object of the present invention is to provide a human-powered vehicle where the rider can steer the guide wheel by means of the seat by shifting their weight left and right.

Additional objects of the present invention will appear as the description proceeds.

The present invention overcomes the shortcomings of the prior art by providing a tricycle with adjustable linkage for varying the drive power for either foot or hand power. Furthermore the linkage can also be used to vary the wheelbase. Moving the front wheel toward the rear wheels provides for a tighter turning radius. Moving the front wheel away from the rear axle provides for greater stability at high speed. In addition the linkage provides for the selective placement along a horizontal and/or vertical plane relative the seat allowing persons of varying size to comfortably position the drive mechanism. Additionally a cantilevered seat with the seat at one distal end and the other forming a yoke connected to the front wheel steering column allows the rider to steer the vehicle by moving the seat laterally.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
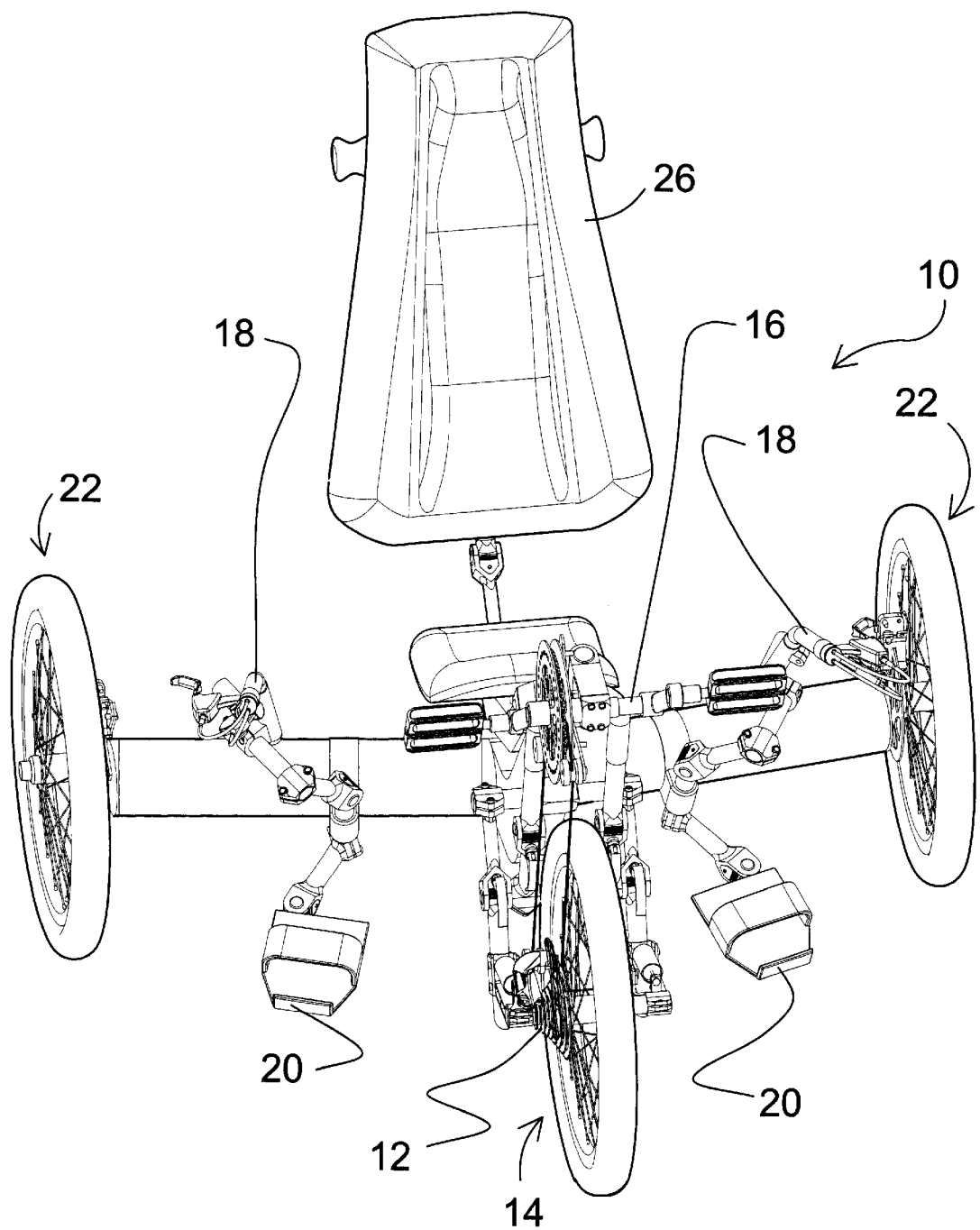
FIG. 1 is a perspective view of the tricycle.

With regard to reference numerals used, the following numbering is used throughout the drawings.

A pivot axis
B pivot axis
C pivot axis
10 present invention
12 sprockets
14 front wheel
16 pedal assembly
18 handle assembly
20 foot rest
22 rear wheel
23 axle
24 bottom seat
25 tongue
26 back seat
28 main frame
30 seat frame
32 seat frame clamp
34 steering pivot column
35 radial arms
36 front wheel assembly
37 locking means
38 steering pivot slot
40 drive chain
42 seat assembly
44 primary extension clamp
48 pedal extension clamp
52 front wheel column
54 pedal column
56 front wheel arm
58 front wheel axle
60 front wheel arm clamp
62 pedal U-fork
64 seat frame pivot
66 chain support arm assembly
68 drive chain
70 derailleur assembly
72 pedal clamp
74 roller arm body
76 chain guard
78 chain roller
80 roller pin
84 back seat frame
86 back seat column
88 back seat extension clamp
90 back seat joints
92 slide retainer

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For a definition of the complete scope of the invention, the reader is directed to the appended claims.

Turning to FIG. 1, shown therein is a perspective view of the tricycle of the present invention 10. Shown is the present invention 10 with the derailleur line and the brake lines removed for a clearer view. The sprockets 12 and the derailleur are installed in the front wheel 14. The pedal assembly 16 is positioned over the front wheel 14 to drive it. The front wheel 14 and the pedal assembly 16 can be repositioned using various joints. Also shown are the handle assembly 18 and a pair of foot rests 20, a pair of rear wheels 22, a bottom seat 24 and a back seat 26.

Figure 2:
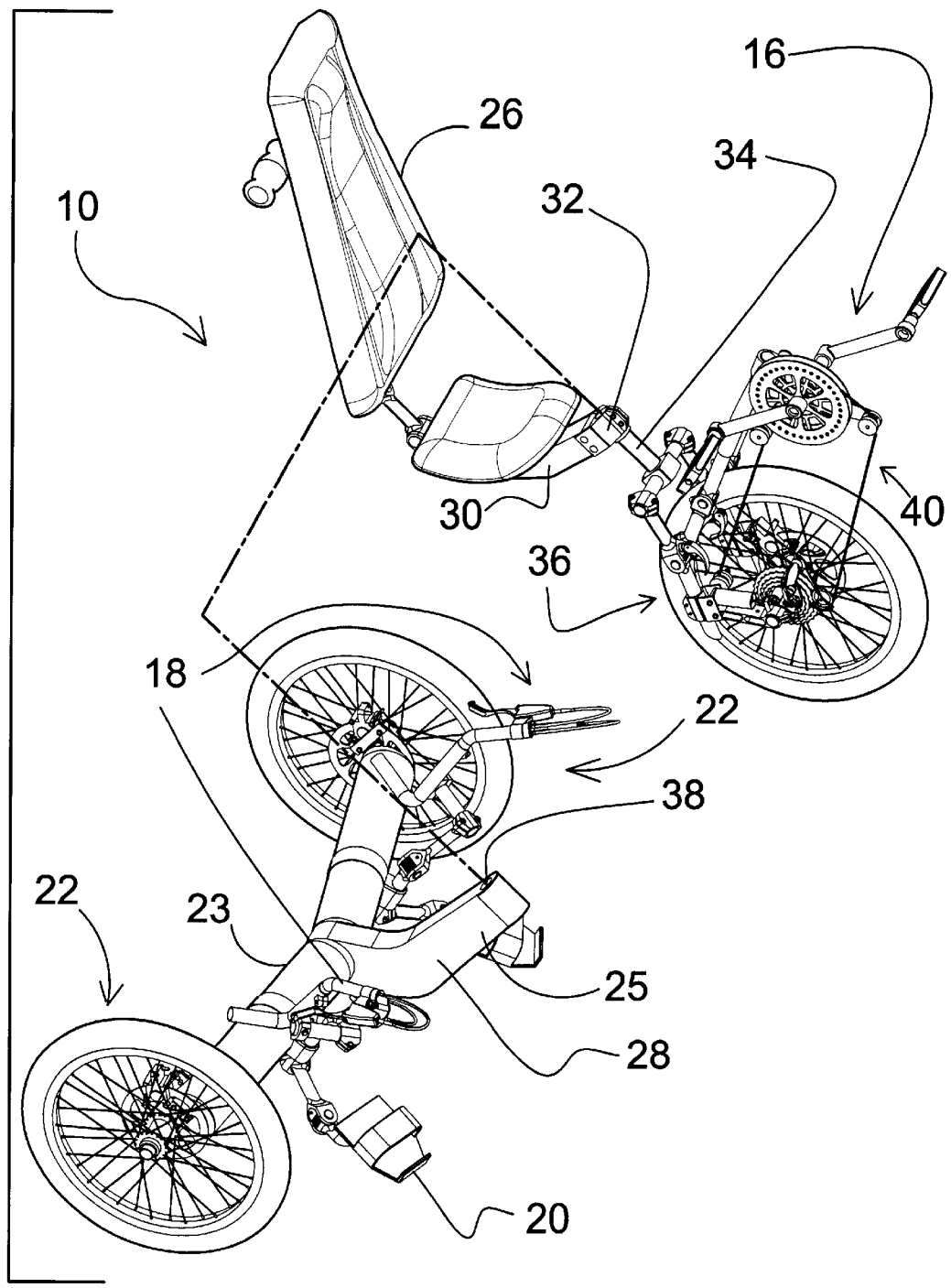
FIG. 2 is an exploded view of the two main parts of the tricycle.

Turning to FIG. 2, shown therein is an exploded view of the two main parts, the rear main frame 28 and front wheel assembly 36, of the tricycle of the present invention 10. The main frame 28 of the tricycle 10 holds the two rear wheels 22 on the ends of axle 23 and has a tongue-like member 25 thereon. The seat frame 30 holds the seats 24, 26 and is pivotably at 69 attached to the seat frame clamp 32, which is rigidly fixed to the steering pivot column 34 and the front wheel assembly 36. These two components, the rear main frame 28 and the front wheel assembly 36, are pivotably engaged to form the tricycle. Also shown are the pedal assembly 16, handle assembly 18, foot rest 20, steering pivot slot 38, and drive chain 40.

Figure 3:
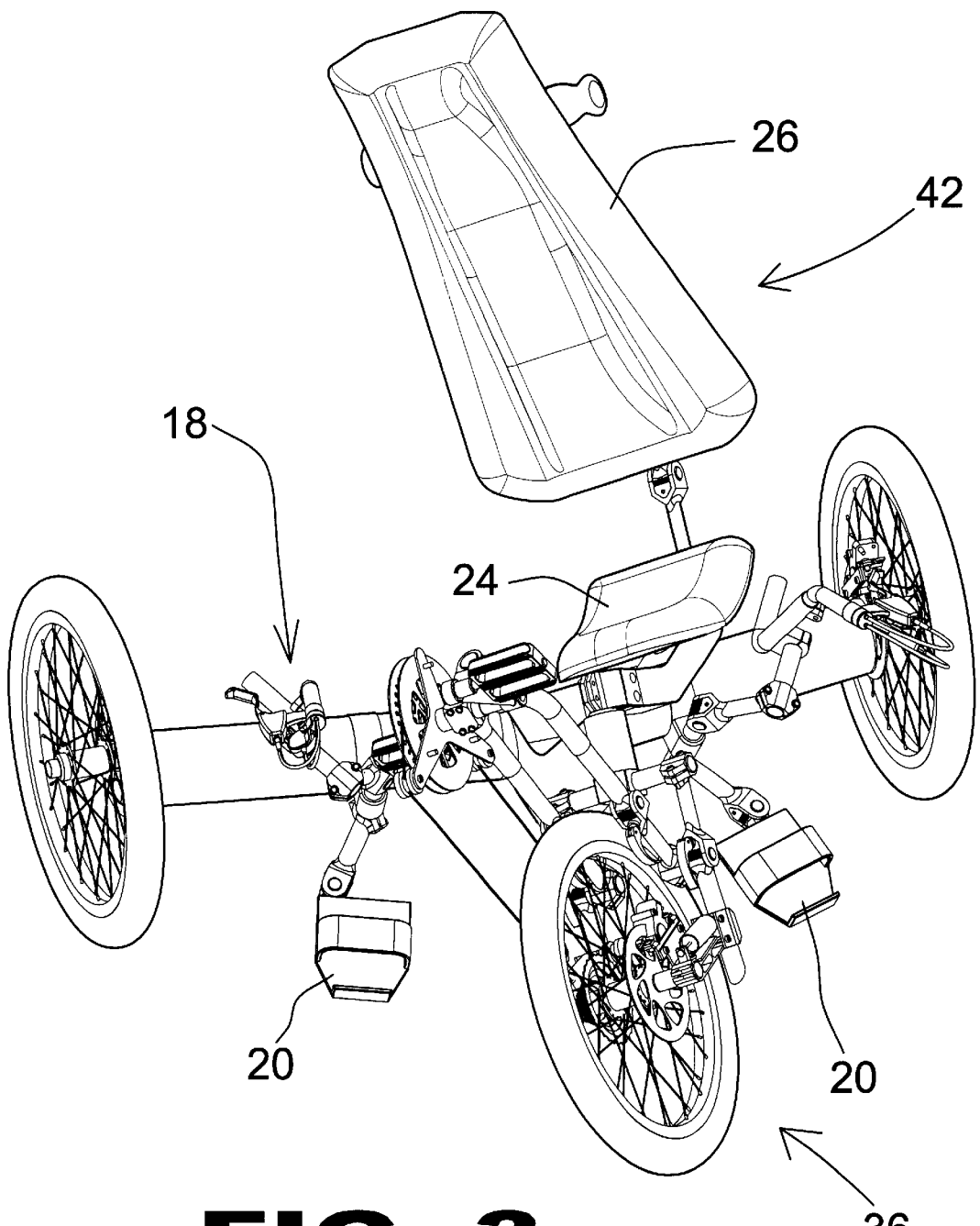
FIG. 3 is a perspective view of the steering operation of the tricycle.

Turning to FIG. 3, shown therein is a perspective view of the steering operation of the tricycle of the present invention 10. Steering is accomplished by a user applying torque to the front wheel assembly 36 and seat assembly 42 with bottom seat 24 and back seat 26 by pushing the handles of handle assembly 18 with the hands while pedaling with the feet. Alternatively, the steering torque can also be applied by pushing the foot rests 20 with feet while pedaling with the hands. The front wheel assembly 36 and seat frame assembly 42 is itself unstable, but the added weight of a rider on the bottom seat 24 stabilizes the front wheel assembly 36 and seat frame assembly 42.

Figure 4:
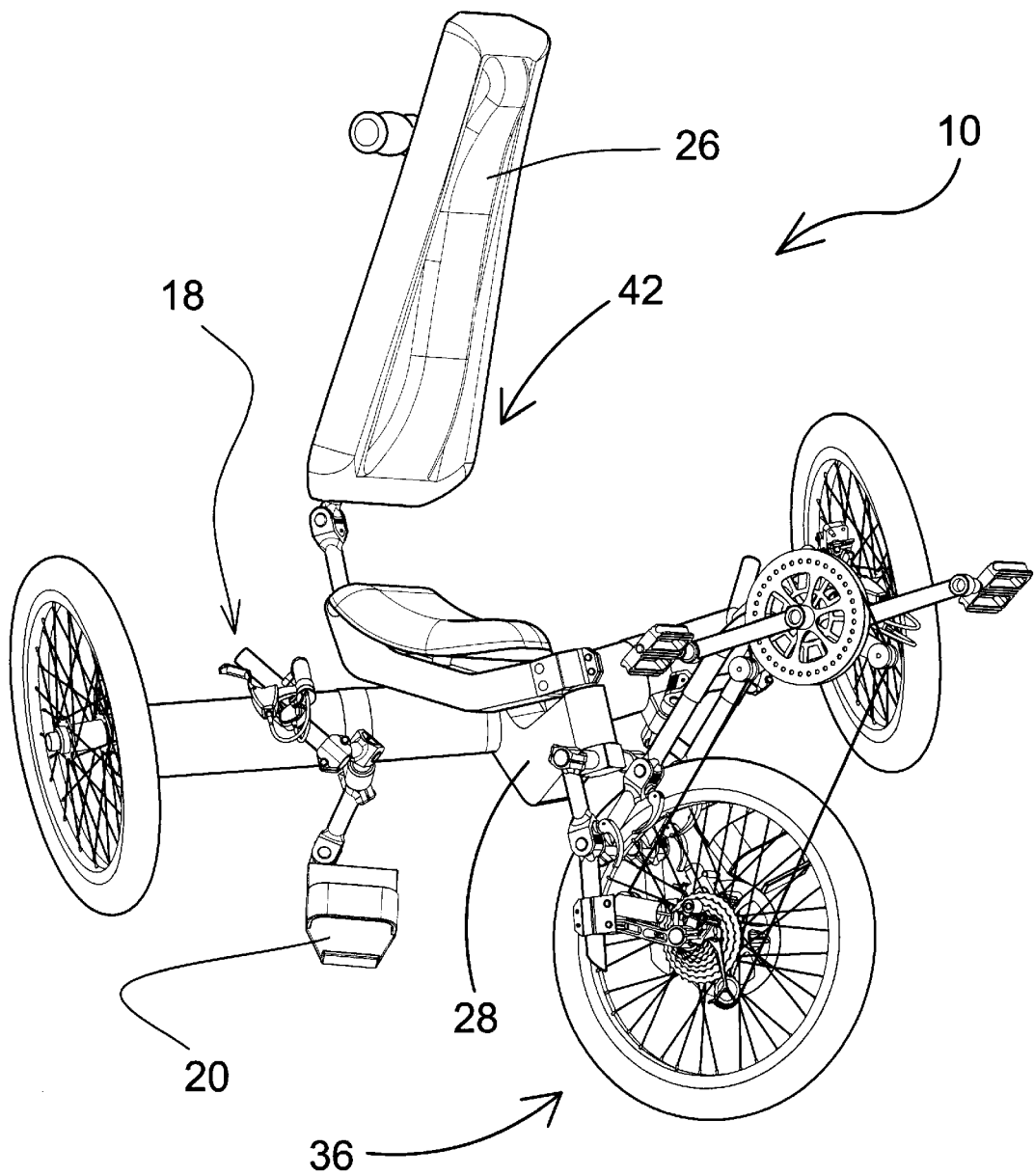
FIG. 4 is a top view of the tricycle shown in FIG. 3.

Turning to FIG. 4, shown therein is a top view of the tricycle of the present invention shown in FIG. 3. Fixed to the main frame 28 are the handle assemblies 18 and the foot rests 20 which provide the leverage needed to apply the steering torque to the front wheel assembly 36 and seat frame assembly 42 with bottom seat 24 and back seat 26 attached thereto.

Figure 5:
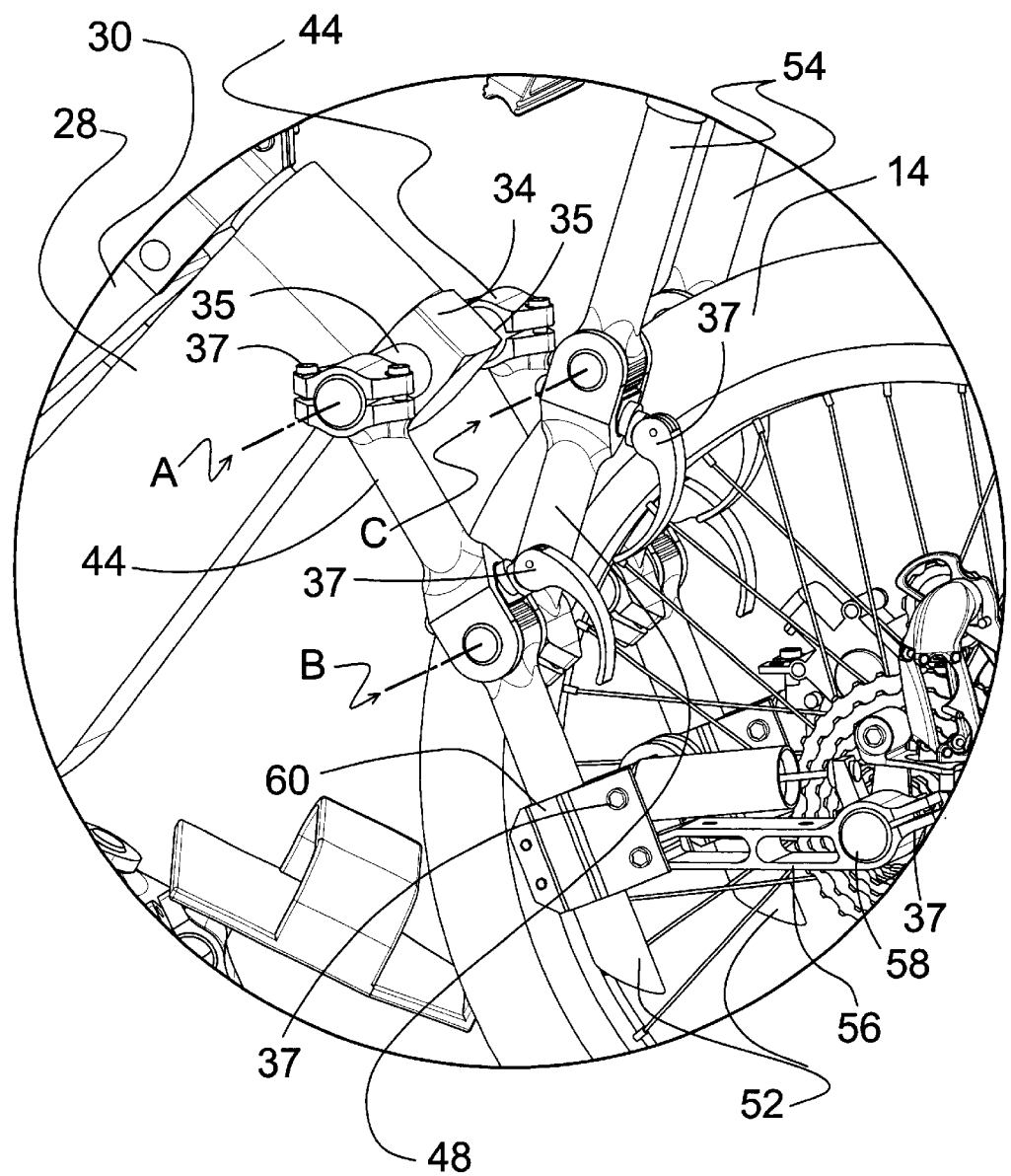
FIG. 5 is a close-up view of the joints around the front wheel.

Turning to FIG. 5, shown therein is a close-up view of the joints associated with the front wheel 14. Extending downward from the two radially extended opposed arms 35 on the lower end of the steering pivot column 34 are two, a right and a left, symmetrical primary extension clamps 44, pivoting around the axis A. Joined to these are the pedal extension clamps 48 (only right side shown) and the front wheel columns 52, pivoting around the axis B. The pedal columns 54 are attached to the pedal extension clamps 48, pivoting around the axis C. The front wheel 14 is attached to the front wheel arm 56 by the front wheel axle 58. The front wheel arm 56 is attached to the front wheel arm clamp 60, which is slidably clamped to the front wheel columns 52. The entire front wheel assembly and pedal assembly, therefore, pivot around the axis A. The front wheel 14 can also pivot around the axis B independently as well as slide along the front wheel columns 52. The pedal assembly (not shown) can pivot around the axes B and C without affecting the front wheel 14. Also shown are the main frame 28 rotatably disposed on the steering pivot column 34 and seat frame 30. The pivot joints A, B and C are fixedly pivotable having means for being fixed such as fastening, clamping or locking means 37 as shown.

Figure 6:
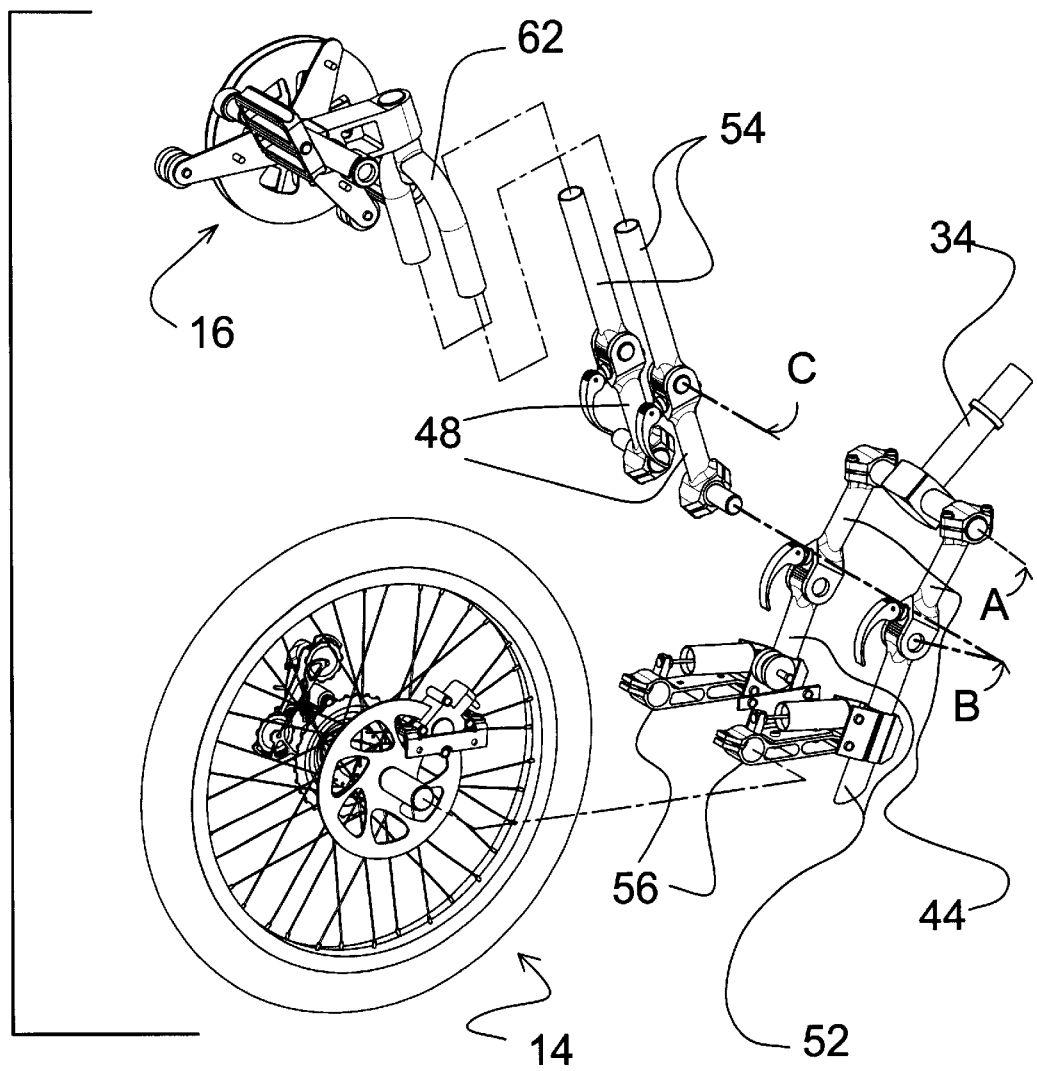
FIG. 6 is an exploded view of the front joints.

Turning to FIG. 6, shown therein is an exploded view of the front joints as previously disclosed. The front joints in FIG. 5 are exploded and shown from the left side (of a rider). All of the extension clamps, columns and arms are positioned and moved and operated symmetrically on both the left and right sides. Also shown is the pedal U-fork 62.

Figure 7:
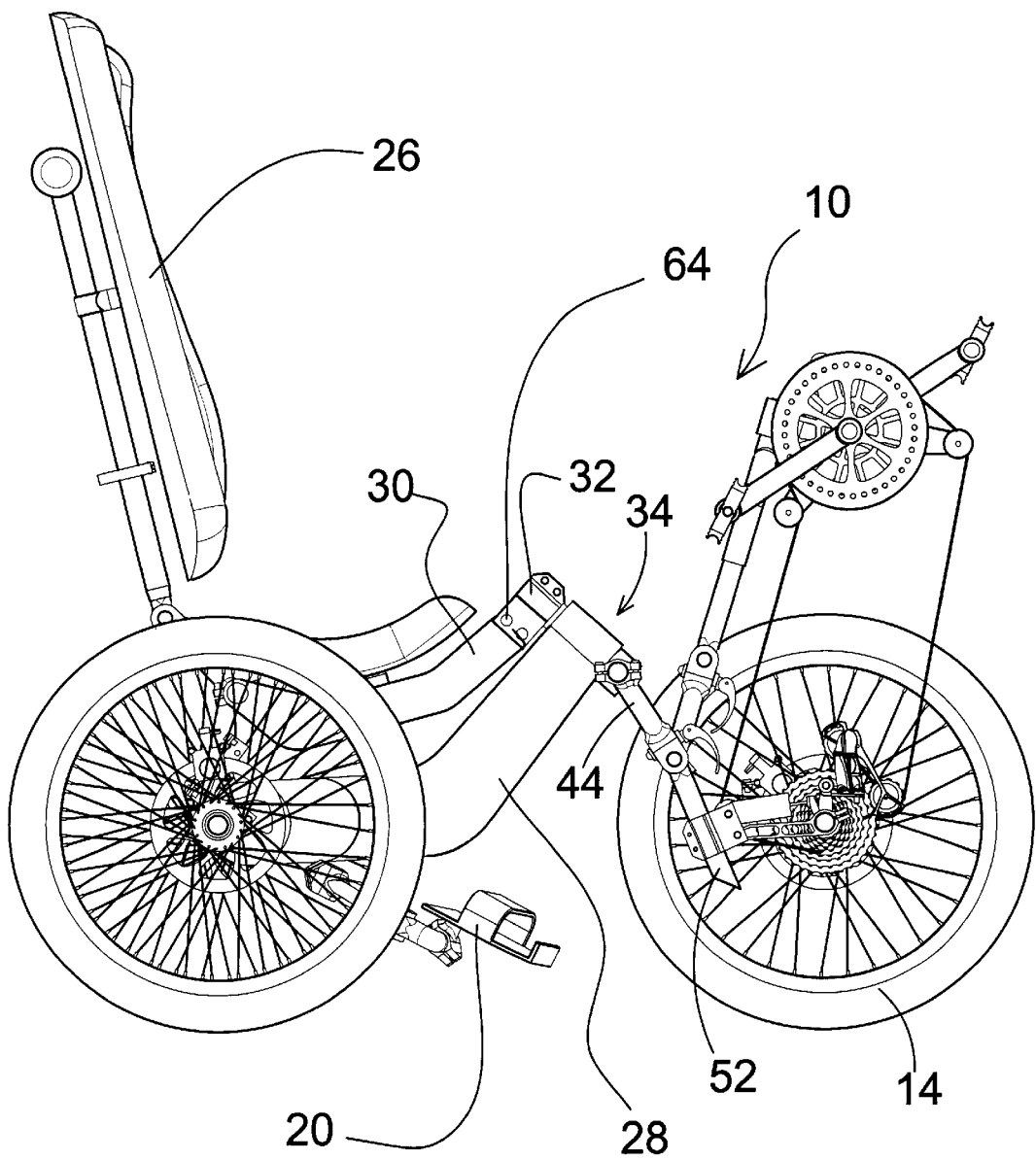
FIG. 7 is a side view of the tricycle.

Turning to FIG. 7, shown therein is a side view of the tricycle 10. Clearly seen are the primary extension clamps 44 and the front wheel columns 52 stemming from the steering pivot column 34. These extension clamps 44 and columns 52 can be independently adjusted for optimum position of the front wheel 14. Also shown is the seat frame pivot 64. Other elements previously disclosed are also shown.

Figure 8:
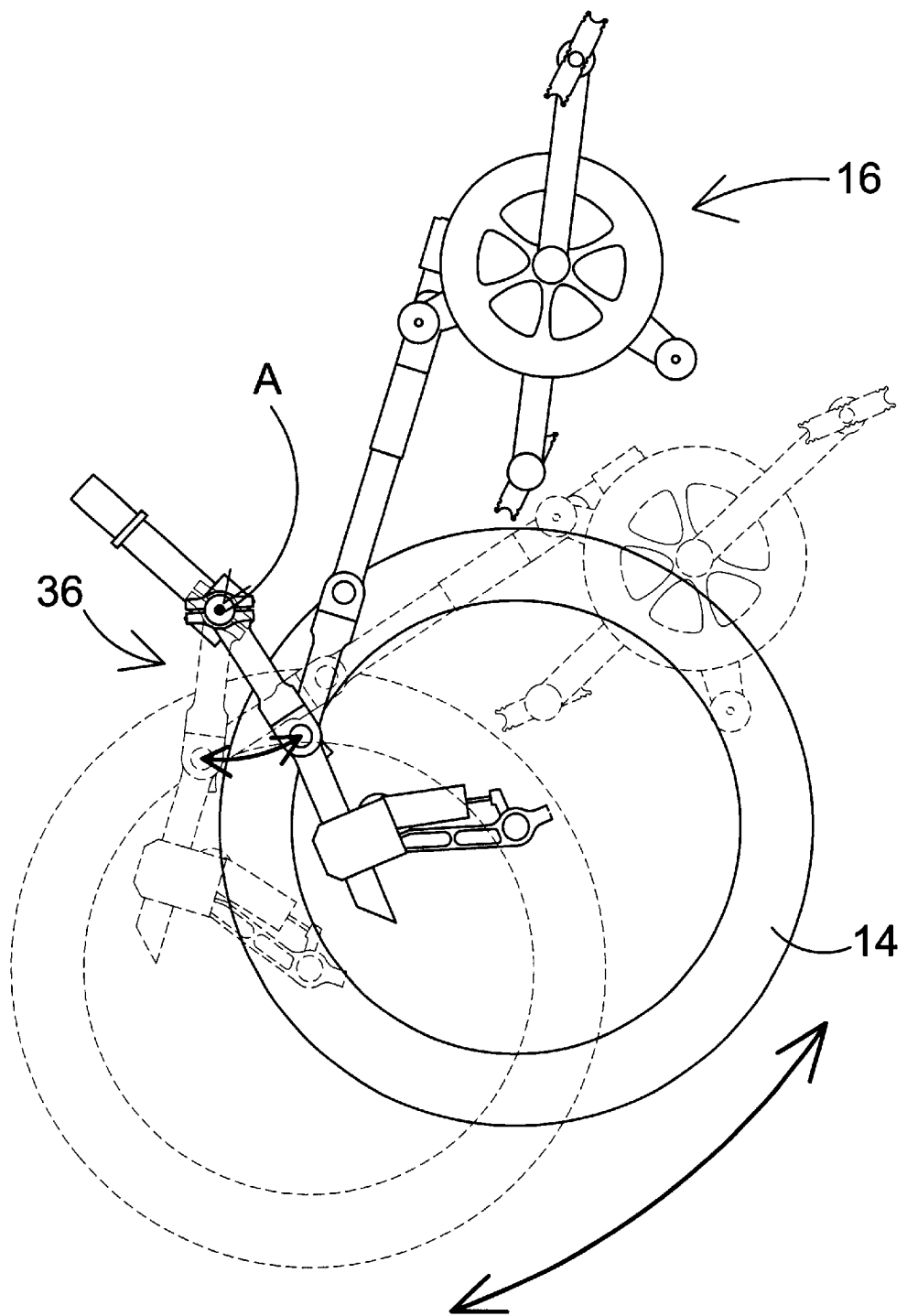
FIG. 8 is a diagram of a pivoting movement of the front wheel.

Turning to FIG. 8, shown therein is a diagram of a pivoting movement of the front wheel 14. The diagram shows the pivoting movement of the front wheel 14 in a vertical plane around the pivot axis A. This pivoting movement rotates the entire wheel assembly 36 and the pedal assembly 16 as one body along the longitudinal axis of the vehicle.

Figure 9:
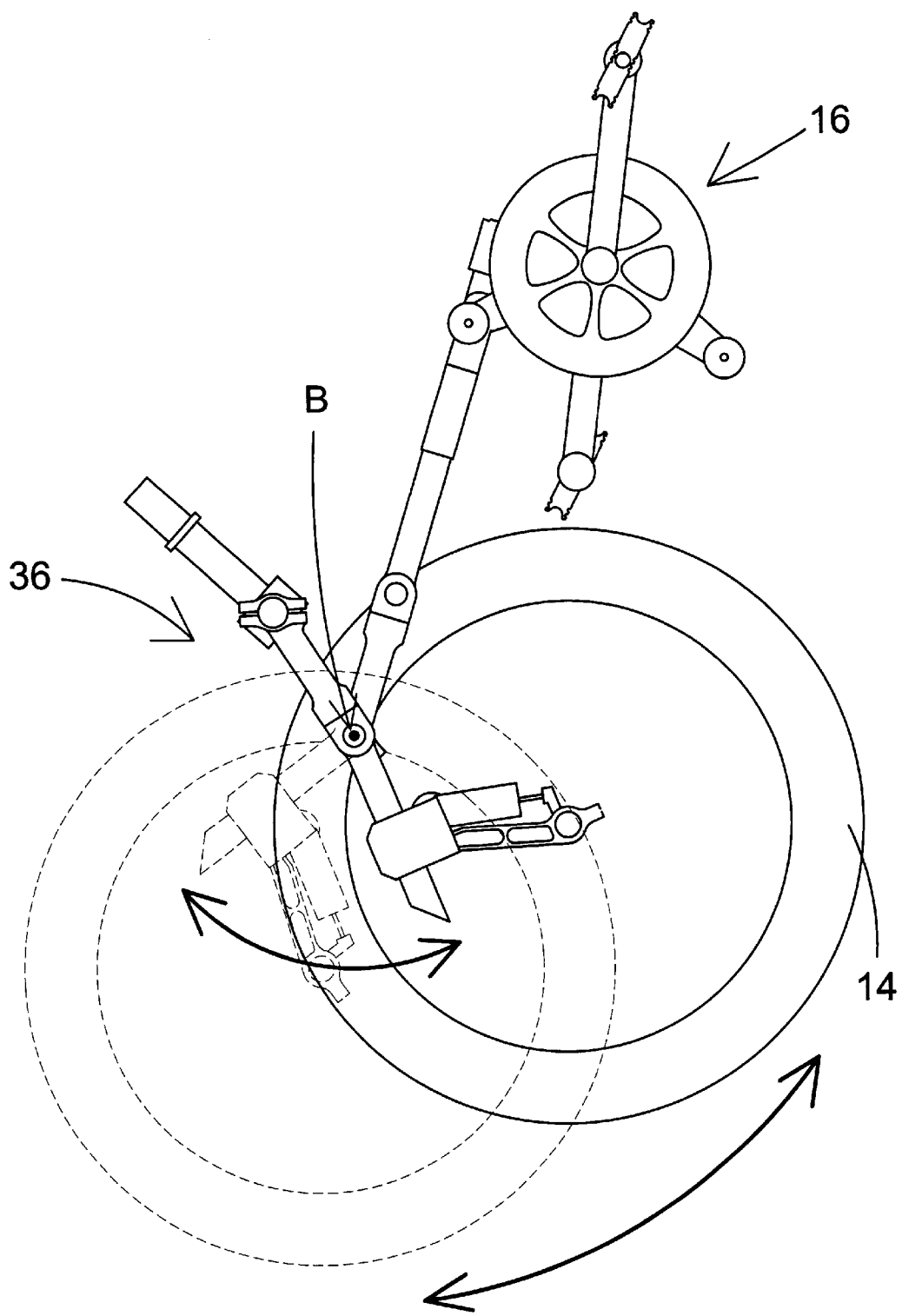
FIG. 9 is a diagram of a pivoting movement of the front wheel.

Turning to FIG. 9, shown therein is a diagram of a pivoting movement of the front wheel 14. The diagram shows the pivoting movement of the front wheel assembly 36 around the pivot axis B. The pivot axis B can be used to rotate the front wheel assembly 36 and the pedal assembly 16 independently or together. This movement is in the vertical plane along the longitudinal axis of the vehicle.

Figure 10:
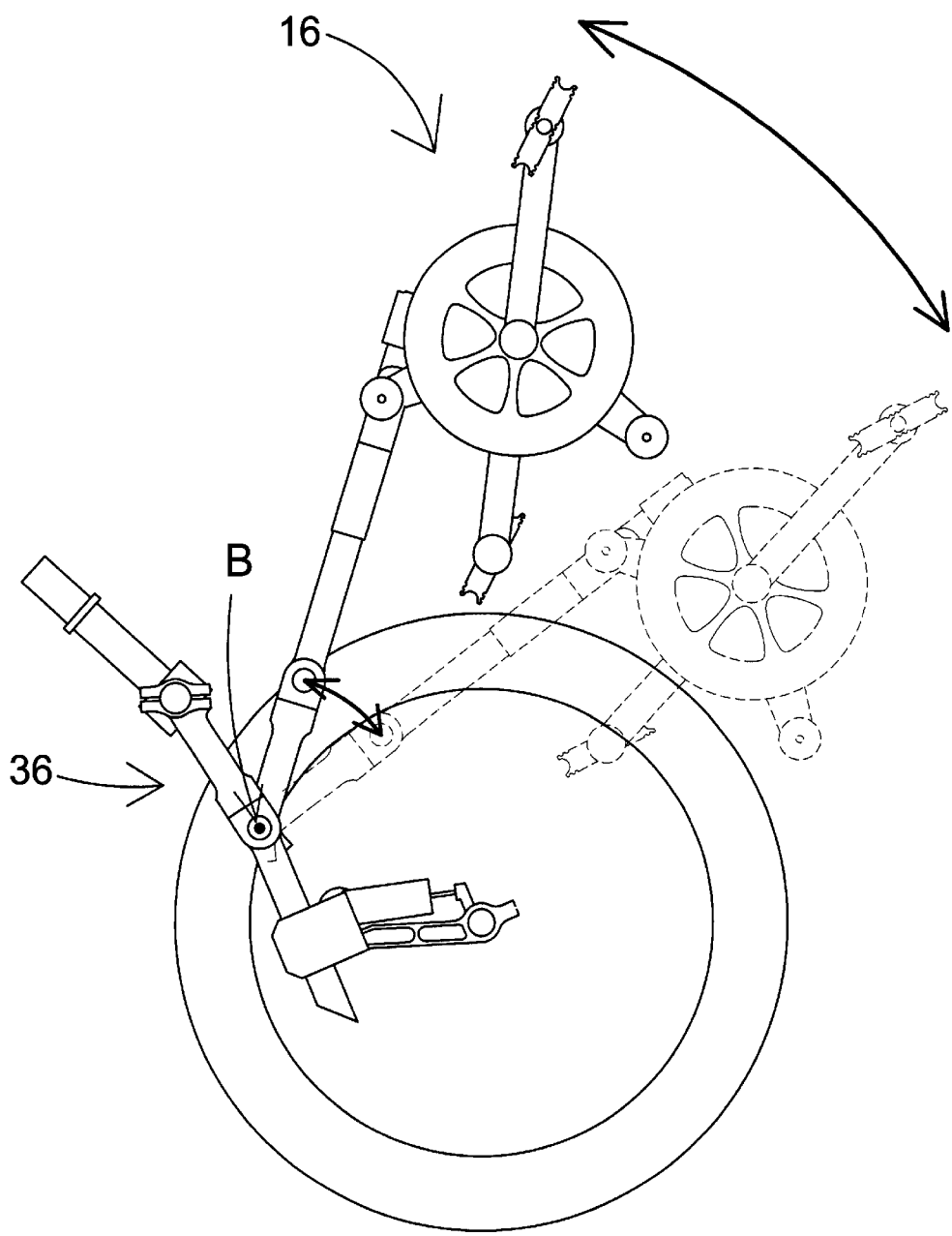
FIG. 10 is a diagram of a pivoting movement of the pedal assembly.

Turning to FIG. 10, shown therein is a diagram of a pivoting movement of the pedal assembly 16. The diagram shows the pivoting movement of the pedal assembly 16 around the pivot axis B. The pivot axis B can be used to rotate the front wheel assembly 36 and the pedal assembly 16 independently or together. This movement is in the vertical plane along the longitudinal axis of the vehicle.

Figure 11:
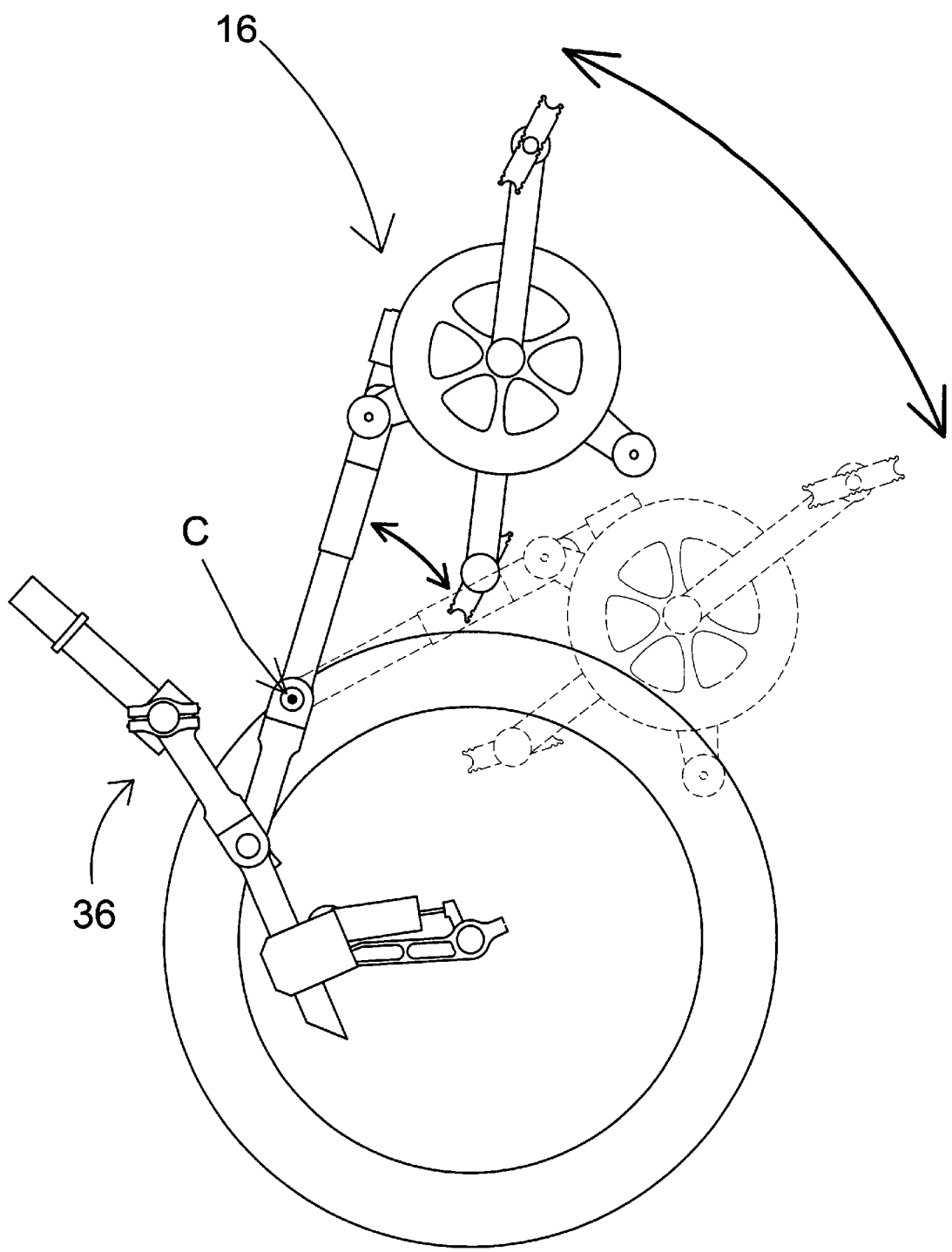
FIG. 11 is a diagram of a pivoting movement of the pedal assembly.

Turning to FIG. 11, shown therein is a diagram of a pivoting movement of the pedal assembly 16. The diagram shows the pivoting movement of the pedal assembly 16 around the pivot axis C. The pivot axis C is used to change the pedal assembly 16 without affecting the front wheel assembly 36. This movement is in the vertical plane along the longitudinal axis of the vehicle.

Figure 12:
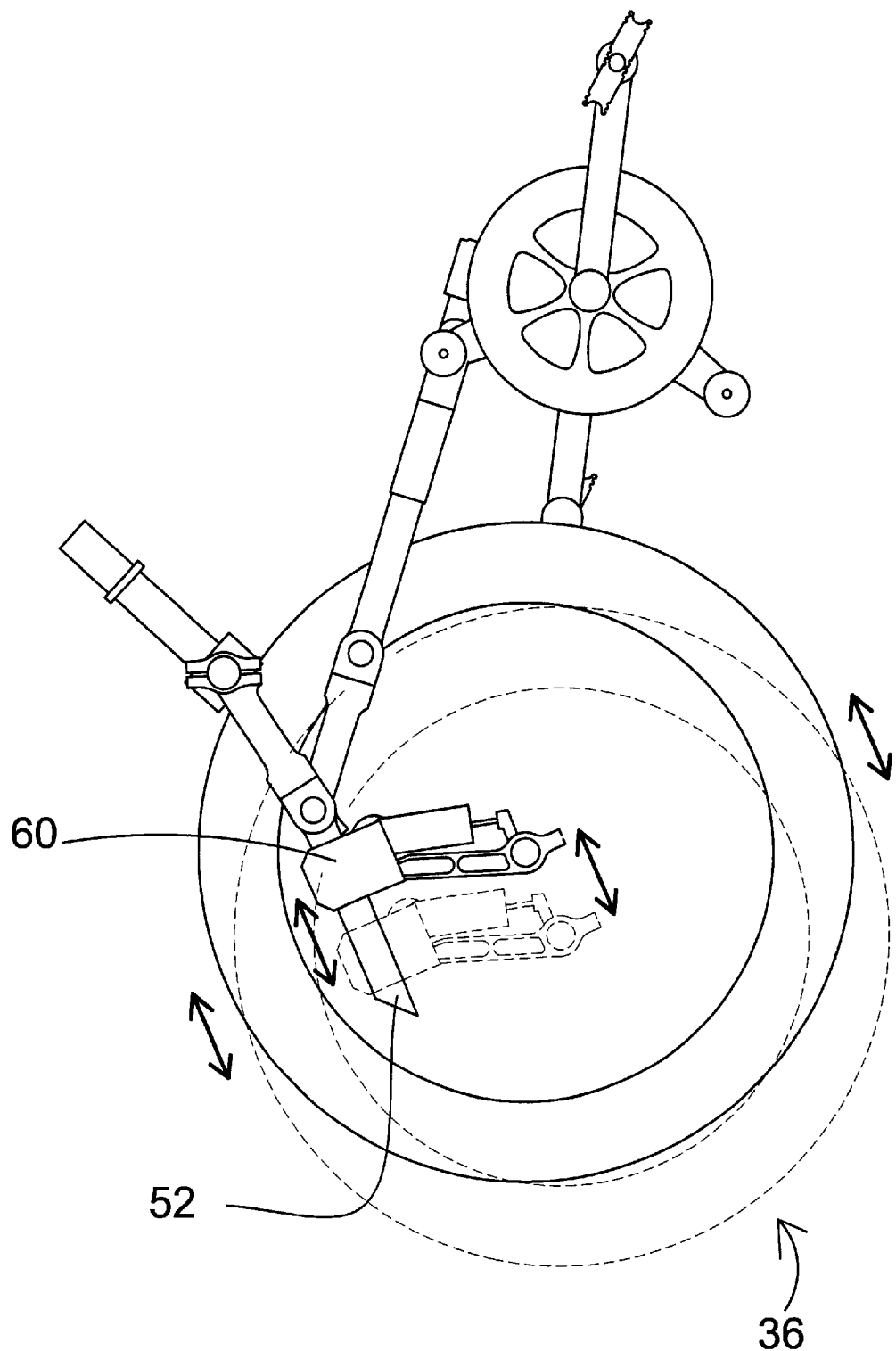
FIG. 12 is a diagram of a sliding movement of the front wheel.

Turning to FIG. 12, shown therein is a diagram of a sliding movement of the front wheel assembly 36. This diagram shows the front wheel arm clamp 60 sliding along the front wheel column 52 carrying the front wheel assembly 36 with it. This movement is in the vertical plane along the longitudinal axis of the vehicle.

Figure 13:
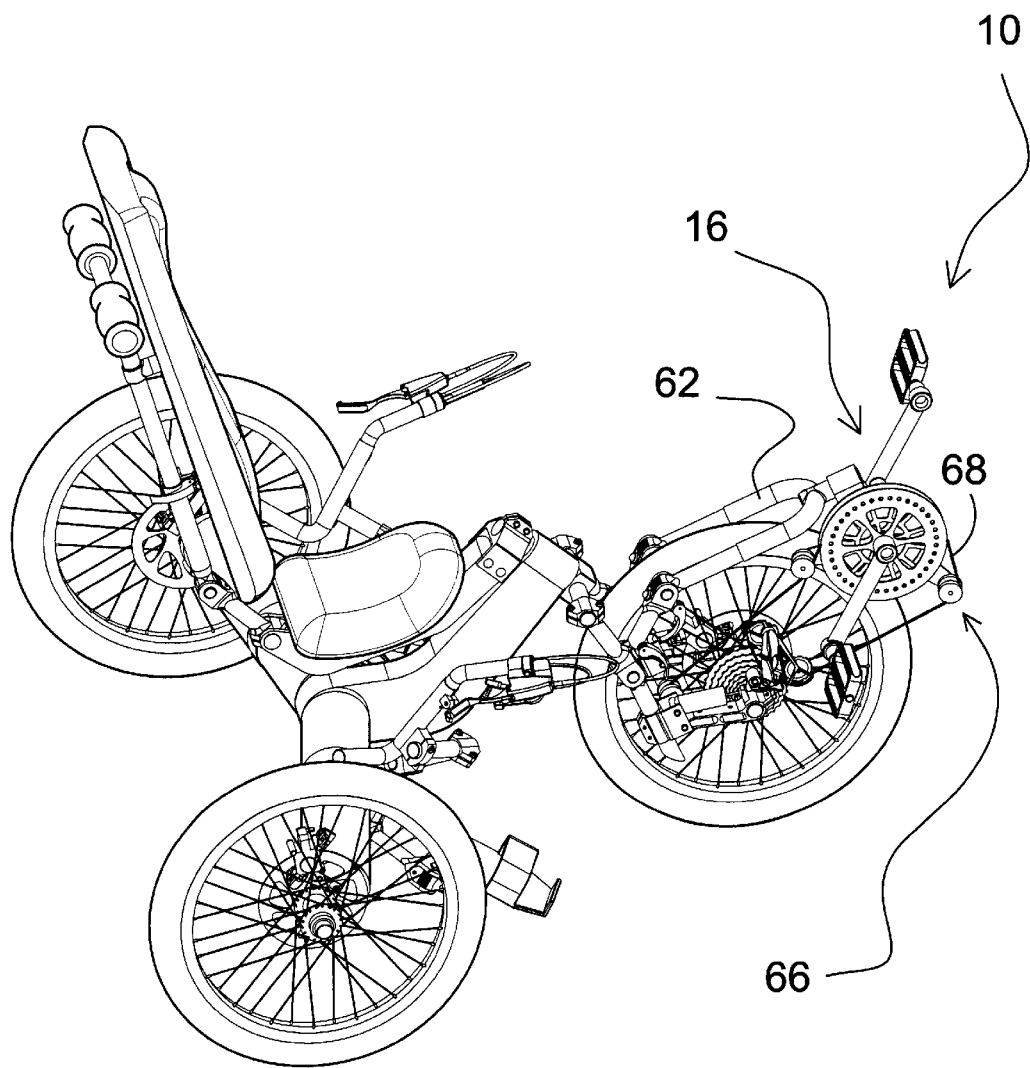
FIG. 13 is a perspective view of the tricycle with the pedal assembly fully extended forward.

Turning to FIG. 13, shown therein is a perspective view of the tricycle 10 with the pedal assembly 16 fully extended forward for foot peddling. All three pivot axes A, B and C as shown in FIGS. 5 and 6 can be used to position the pedal assembly 16 in a comfortable and functional position. Shown here is the pedal assembly 16 fully extended out to the front for comfortable pedaling by the feet. The pedal U-fork 62 allows the pedal assembly 16 to be tilted deep into the forward position. The chain support arm assembly 66 is rotated counterclockwise to keep the drive chain 68 taut or tight.

Figure 14:
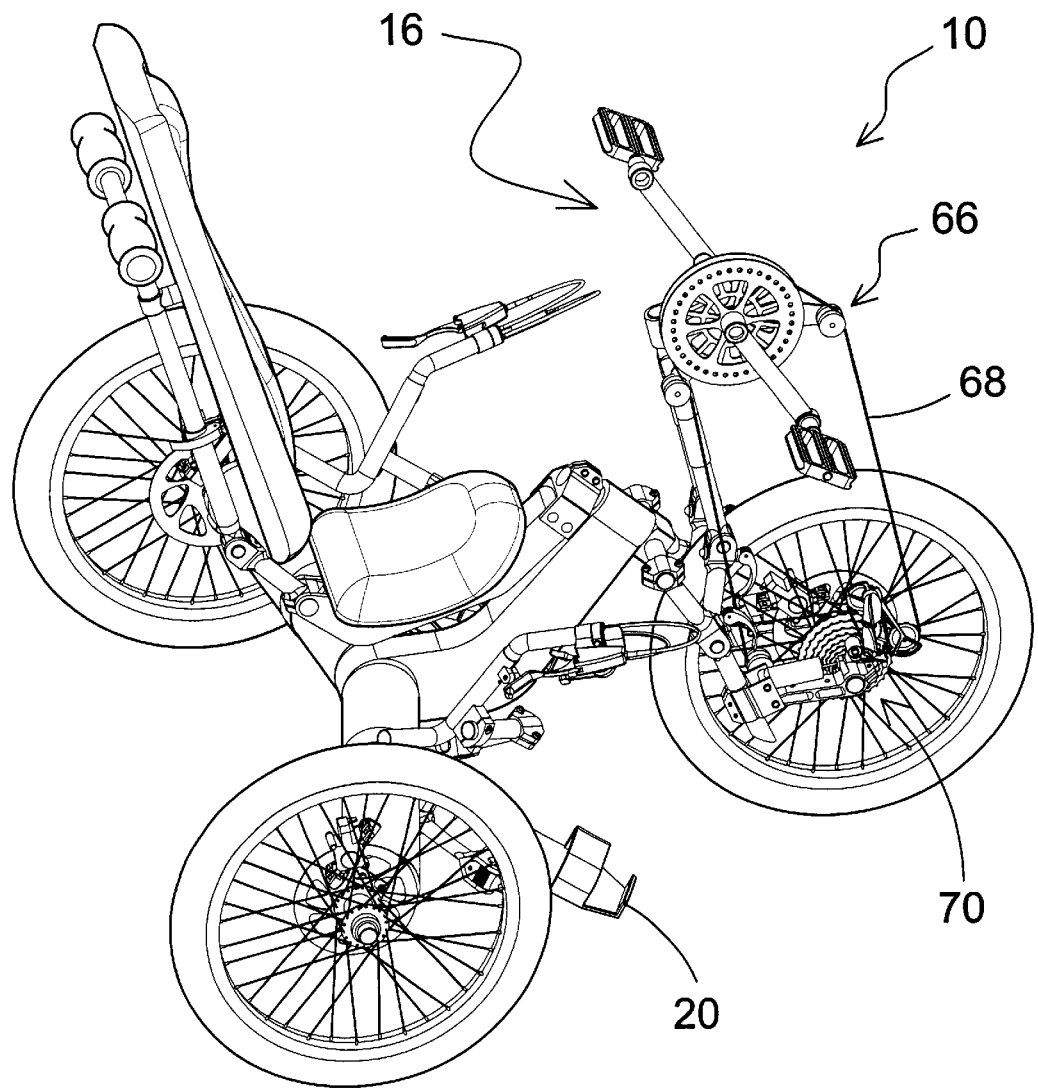
FIG. 14 is a perspective view of the tricycle with the pedal assembly pulled up close for hand pedaling.

Turning to FIG. 14, shown therein is a perspective view of the tricycle 10 with the pedal assembly 16 pulled up close for hand pedaling. When pedaling is done by hand, the rider's feet are on foot rests 20 and provide necessary torque for steering. The chain support arm assembly 66 is relaxed for the drive chain 68 to be stretched upward. The chain support arm assembly 66 works in conjunction with the derailleur assembly 70 in making sure that the drive chain 68 is always properly tensioned.

Figure 15:
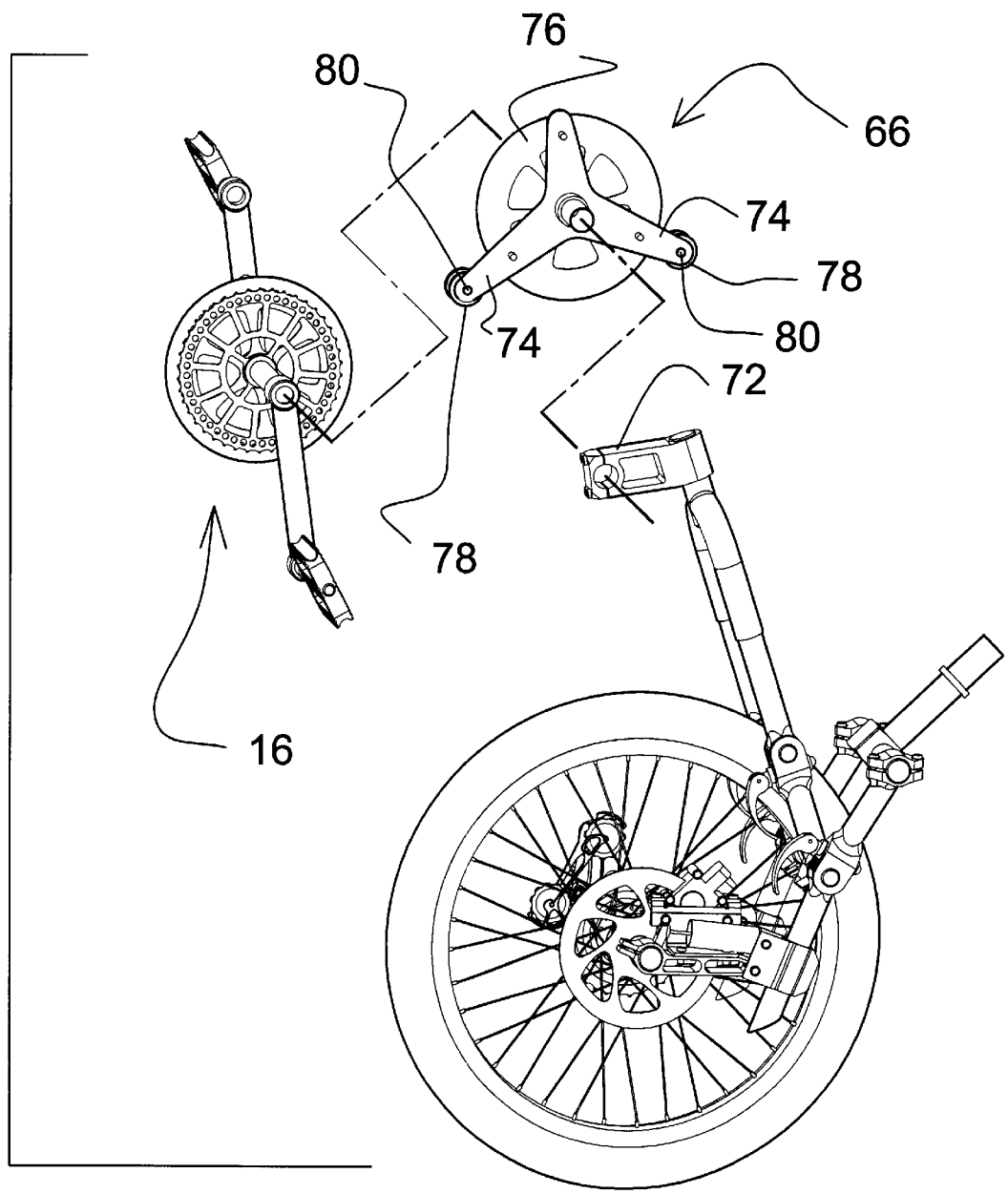
FIG. 15 is an exploded view of the pedal and chain support arm assemblies.

Turning to FIG. 15, shown therein is an exploded view of the pedal assembly 16 and chain support arm assemblies 66. The pedal assembly 16 and the chain support arm assembly 66 are rotationally inserted into the pedal clamp 72, thereby sharing the same axis of rotation. The body of the chain support arm assembly 66 comprises the roller arm body 74 fixed to the chain guard 76. A chain roller 78 on a roller pin 80 is rotationally fixed at the ends of each of the two roller arms 74. The chain support arm 66 employs means to fix it in position once adjusted.

Figure 16:
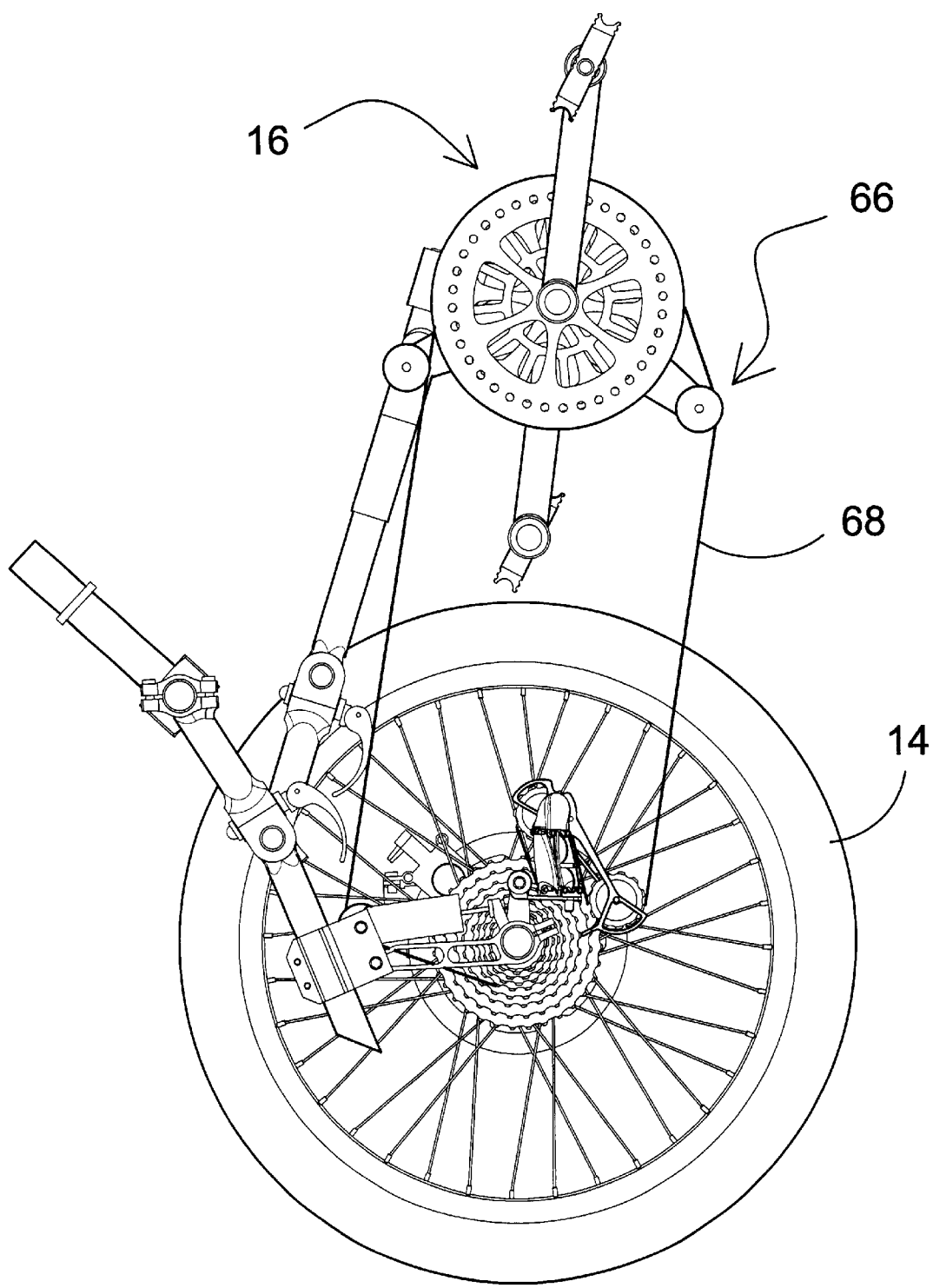
FIG. 16 is a side view of the front wheel and pedal assembly in which the chain support arm assembly is relaxed for maximum extension of the drive chain.

Turning to FIG. 16, shown therein is a side view of the front wheel 14 and pedal assembly 16 in which the chain support arm assembly 66 is relaxed for maximum extension of the drive chain 68. The chain support arm assembly 66 and the pedal assembly 16 share a common axis of rotation. The chain support arm assembly 66 can be fixed in position frictionally or by spring tension.

Figure 17:
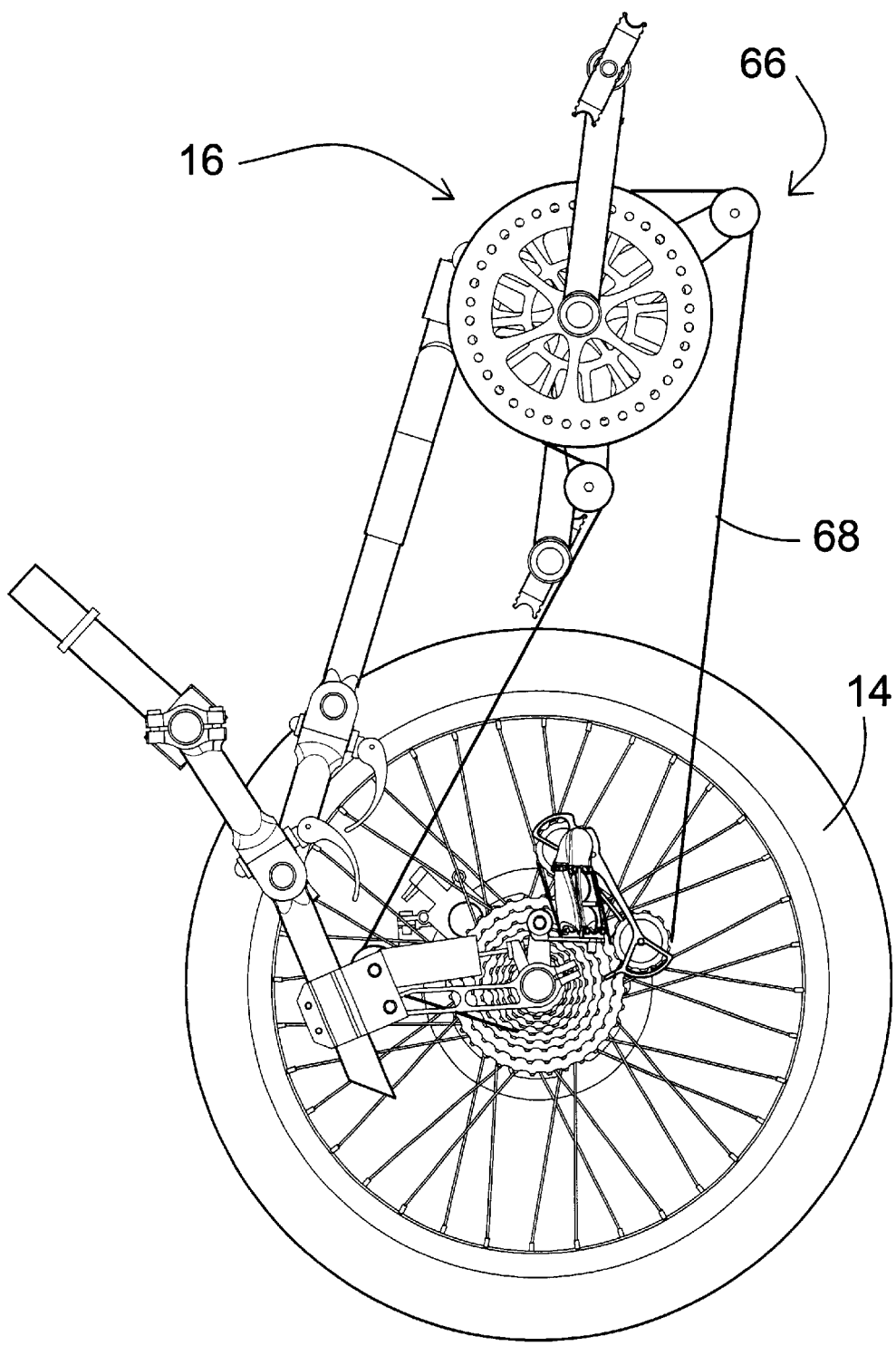
FIG. 17 is the same view of the front wheel and pedal assembly in FIG. 16 with the chain support arm assembly tightened.

Turning to FIG. 17, shown therein is the same view of the front wheel 14 and pedal assembly 16 in FIG. 16 with the chain support arm assembly 66 tightened. Turning the chain support arm assembly 66 counterclockwise tightens the drive chain 68. This is shown in this Figure with the pedal assembly 16 in the same position as in FIG. 16 for comparison. Tightening the drive chain 68 and lowering of the pedal assembly 16 will usually be done in conjunction.

Figure 18:
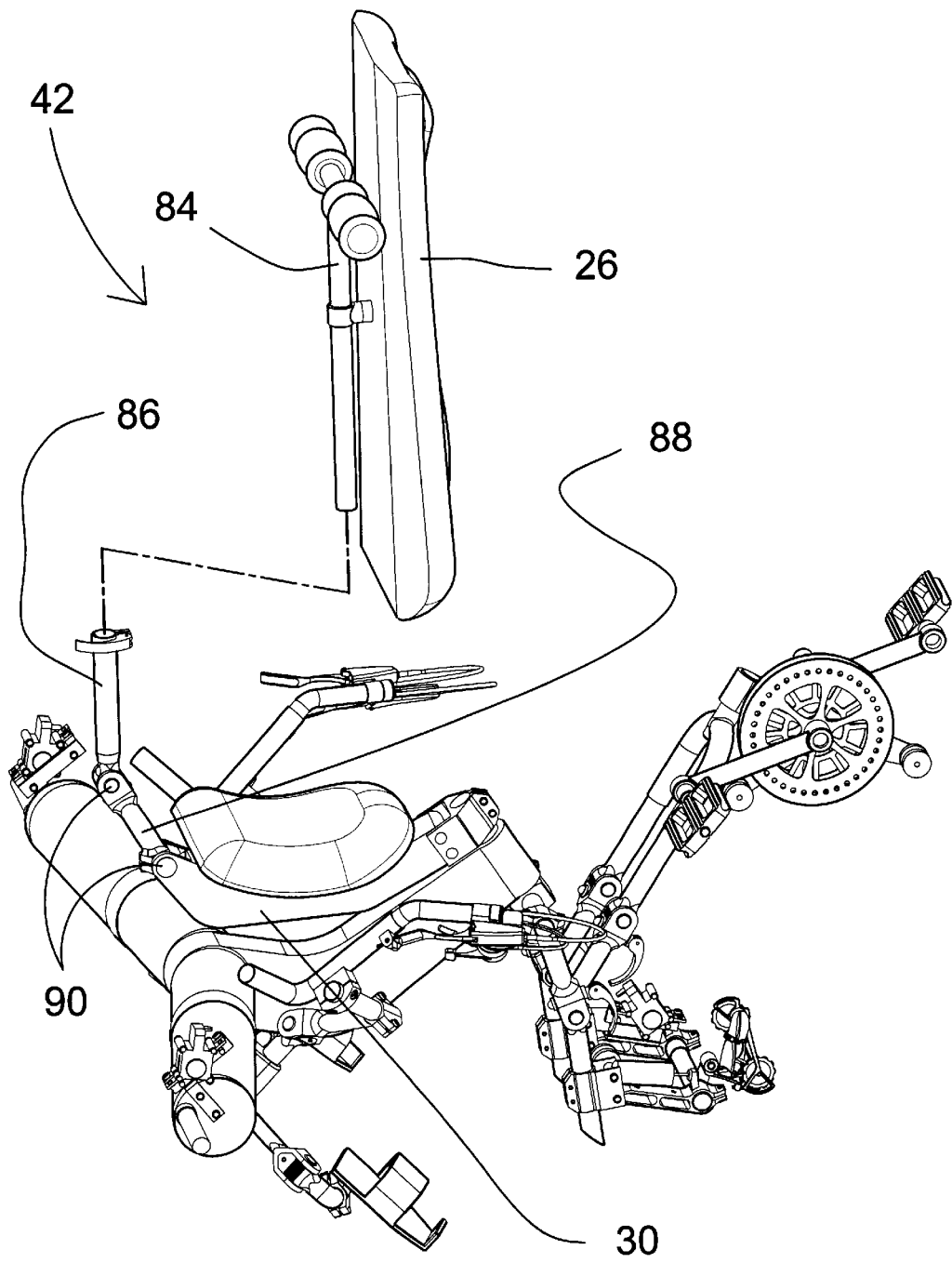
FIG. 18 is a perspective view of the back seat assembly.

Turning to FIG. 18, shown therein is a perspective view of the back seat assembly 42. The tricycle is shown here without the wheels for a clearer view. The back seat frame 84 with back seat 26 attached thereto is inserted into the back seat column 86, which is pivotably joined to the back seat extension clamp 88. The back seat extension clamp 88 is, in turn, pivotably connected to the seat frame 30. This configuration comprises, two back seat joints 90 for adjusting the back seat 26.

Figure 19:
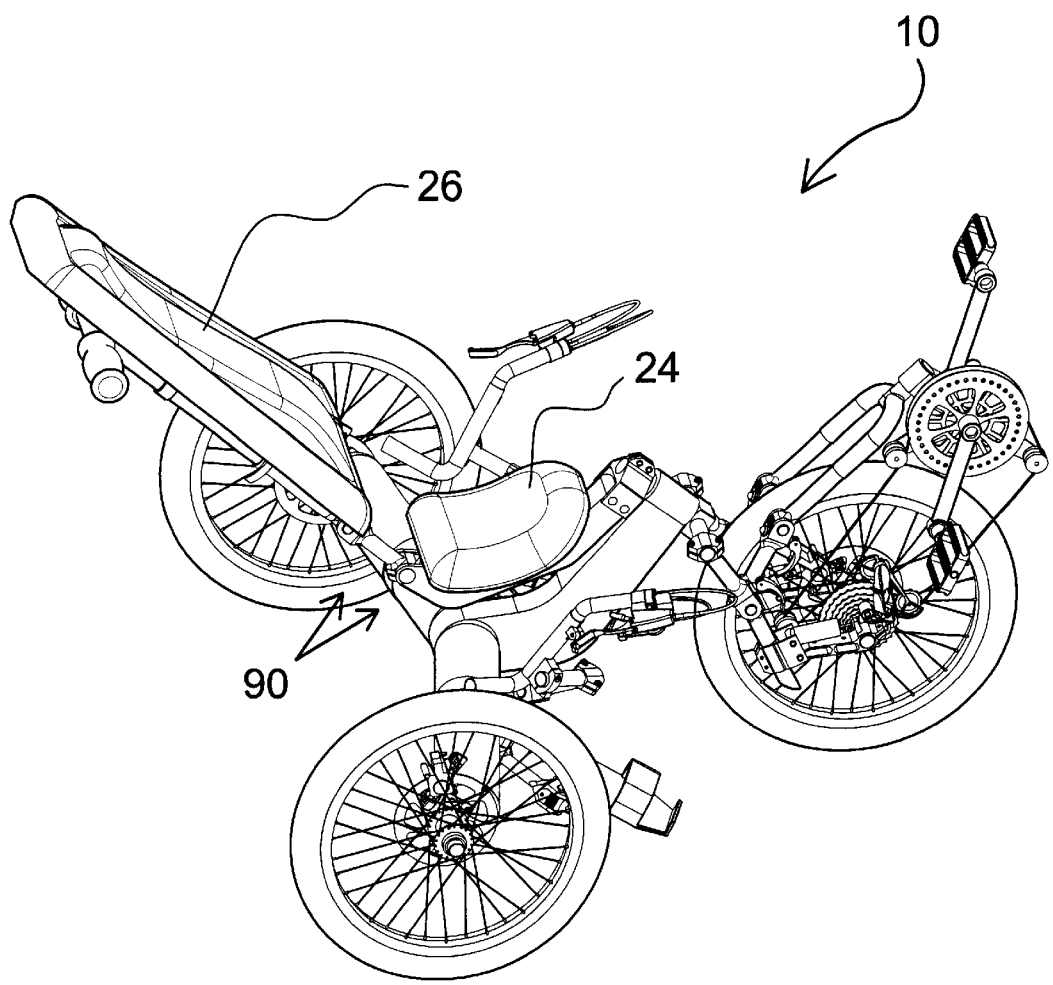
FIG. 19 is a perspective view of the tricycle with the back seat tilted back.

Turning to FIG. 19, shown therein is a perspective view of the tricycle 10 with the back seat 26 tilted back. The tricycle 10 is shown here with the back seat 26 tilted back for a comfortable recumbent riding. Besides changing the angle of the back seat 26, the two back seat joints 90 can be used in unison to bring the back seat forward and back. Also shown is bottom seat 24.

Figure 20:
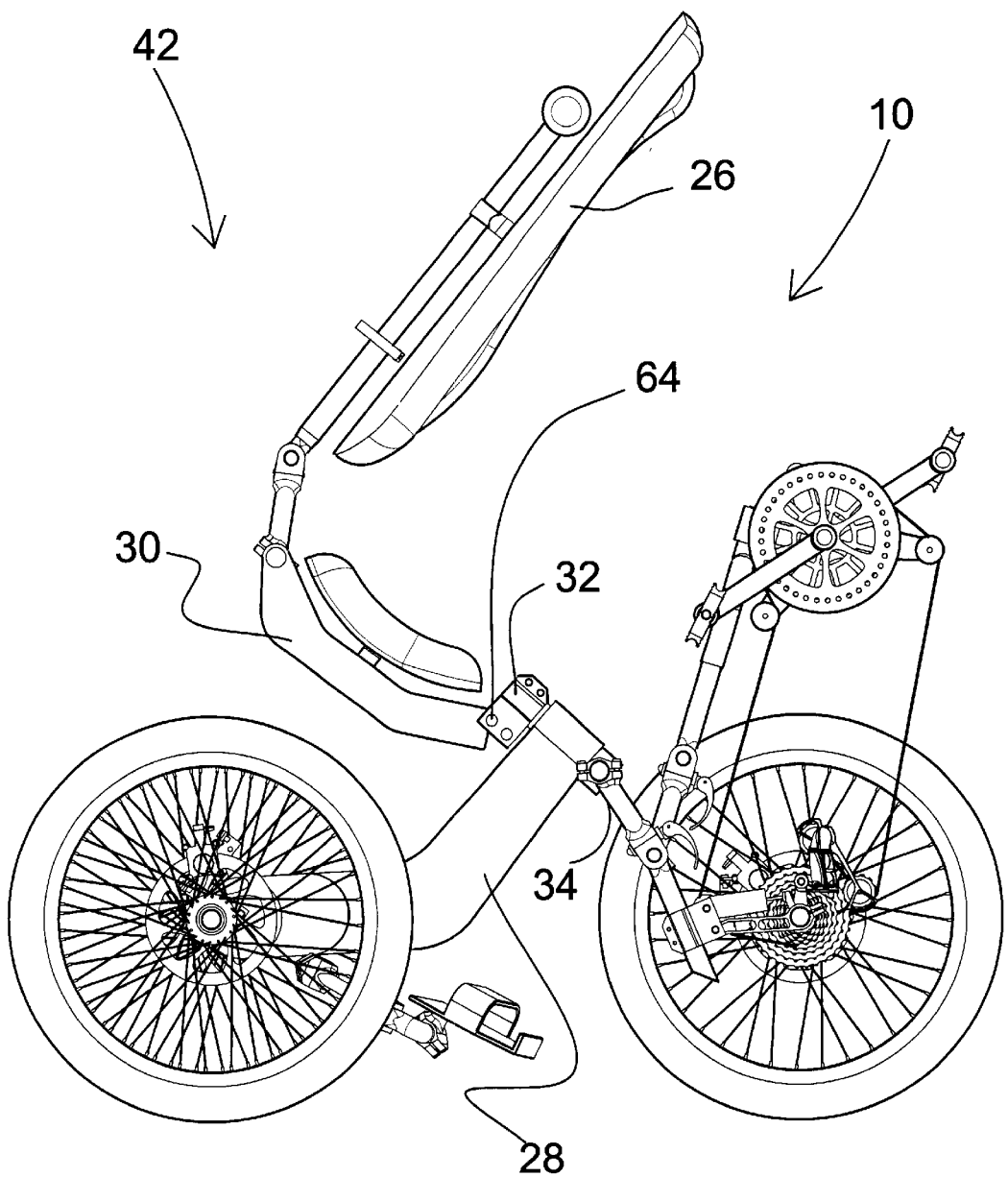
FIG. 20 is a side view of the tricycle with the seat assembly lifted up.

Turning to FIG. 20, shown therein is a side view of the tricycle 10 with the seat assembly 42 lifted up. The seat frame 30 is pivotably attached at 64 to the seat frame clamp 32, thereby allowing the seat assembly 42 to be lifted up. The seat frame clamp 32 itself is rigidly fixed to the steering pivot column 34. Also shown are the back seat 26, main frame 28 and seat frame pivot 64.

Figure 21:
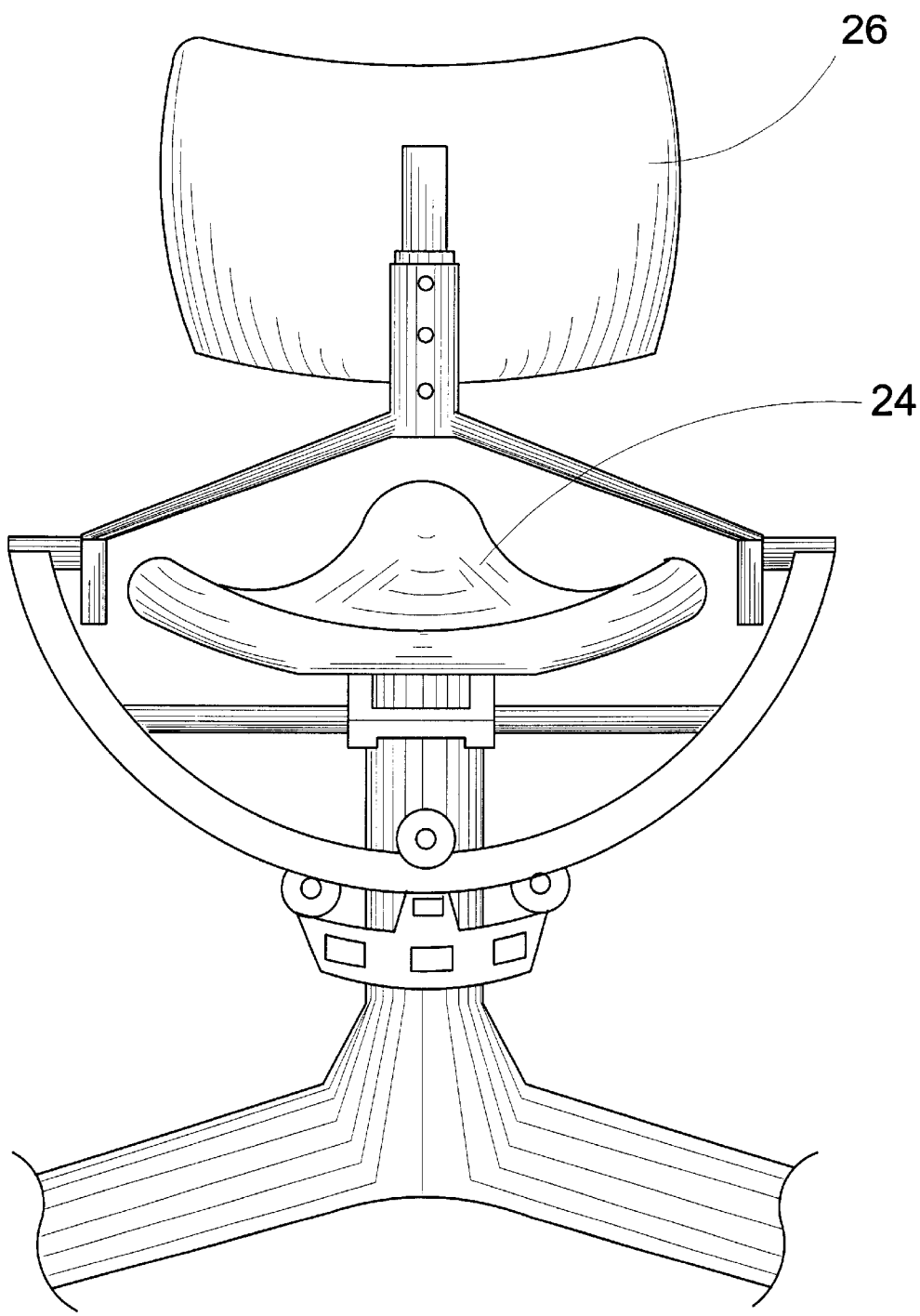
FIG. 21 is a view of an alternate seat.

Turning to FIG. 21, shown therein is a view of an alternate seat design. The tricycle of the present invention can be provided with alternate style seats 24, 26 as the one illustrated.

Figure 22:
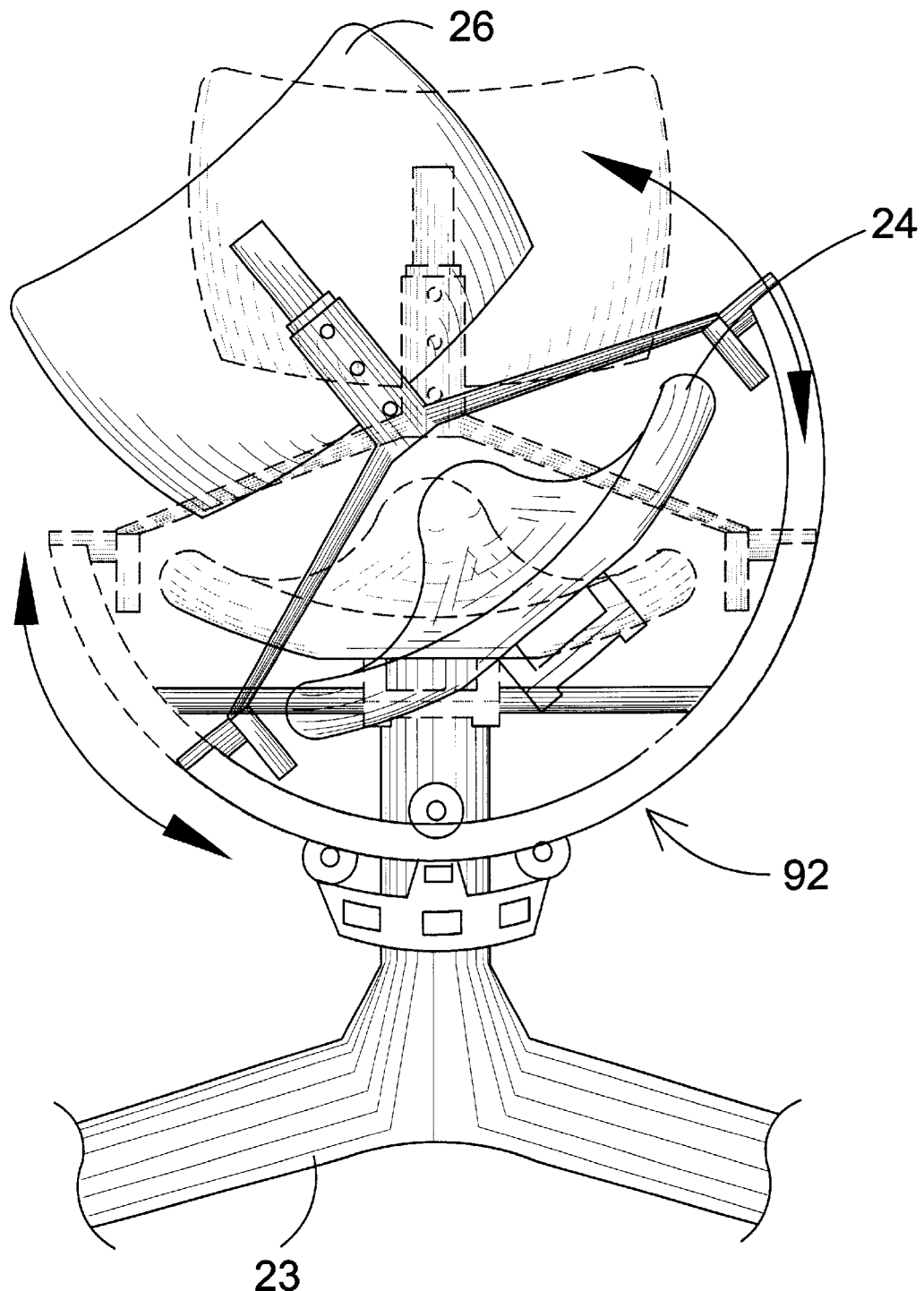
FIG. 22 is a view of an alternate seat in moveable positions.

Turning to FIG. 22, shown therein is an alternate seat 24, 26 in movable positions. FIG. 22 is an illustrative view of an alternate seat 24, 26 of the present invention showing the moveability of the seat 24, 26 as it rides within a slide retainer 92 attached to the rear axle 23. Seats 24, 26 are fixed together and partially rotate in a vertical plane perpendicular to the longitudinal axis of the vehicle.

We claim:

1. A three-wheel vehicle, comprising:

a) a front wheel assembly, said front wheel assembly having a single front wheel disposed thereon to permit said front wheel to turn so as to steer the three-wheel vehicle, said front wheel having a horizontal axle centrally disposed therein;

b) a rear main frame, said rear main frame having two rear wheels disposed thereon, wherein said rear wheels are disposed on opposite ends of an axle member and a tongue member extends forwardly midway from said axle, said tongue having a forward end thereon to permit attachment of the rear main frame to the three-wheel vehicle;

c) a means for connecting said forward end of said tongue member to said front wheel assembly whereby the front wheel assembly is rotatably disposed on the tongue of the rear main frame;

d) a pair of handles disposed on said rear main frame to permit a user to grasp thereto with their hands;

e) a pair of foot rests disposed on said rear main frame to permit a user to place their feet therein;

f) a seat fixedly attached to said front wheel assembly to permit a user to be seated therein, wherein said front wheel is steered by said seat being moved laterally to either side in response to a user pushing on said handles or said foot rests;

g) a pedal assembly disposed on said single front wheel wherein a user may use their hands or feet to pedal the vehicle;

h) a chain drive connecting said pedal assembly and said axle of said single front wheel so that said front wheel is driven by said chain drive; and, i) means for adjusting said pedal assembly and said front wheel assembly in a longitudinal direction with respect to said seat to permit a user to vary the distance from the seat to the pedal assembly and the front wheel assembly.

2. The apparatus of claim 1, wherein said means for adjusting said front wheel assembly comprises:

a) a steering pivot column, said column being slightly inclined toward the rear of the vehicle, said column having a first upper end and a second lower end, wherein a pair of radially opposed arms extend away from said second lower end thereby forming a left and a right arm;

b) a primary extension clamp extending downwardly from each of said radially opposed arms, said primary extension clamp having a first upper end and a second lower end, said first upper end of said primary extension clamp being fixedly pivotally connected to said radially opposed arm to permit the primary extension clamps to pivot in the vertical plane about the radially opposed arms and thereby move the front wheel in a longitudinal direction;

c) a front wheel column extending downwardly from each of said primary extension clamps, said front wheel column having a first upper end and a second lower end, said first upper end of said front wheel column being fixedly pivotally connected to said second lower end of said primary extension clamp to permit the front wheel column to pivot in the vertical plane about the lower end of the primary extension clamps and thereby move the front wheel in a longitudinal direction; and, d) a front wheel arm extending forwardly from each of said front wheel columns, said front wheel arm having a first end and a second end, said first end of said front wheel arm being fixedly slidably disposed onto said front wheel column and said second end of said front wheel arm to be fixedly disposed onto said axle of said front wheel to thereby allow the front wheel to be moved up or down with respect to the front wheel columns.

3. The apparatus of claim 2, wherein said means for adjusting said pedal assembly comprises:

a) a pedal extension clamp extending upwardly from each of said second lower ends of said primary extension clamps, said pedal extension clamp having a first lower end and a second upper end, said first lower end being fixedly pivotally connected to said second lower end of said primary extension clamp and said first upper end of said front wheel column to permit the pedal extension clamp to pivot in the vertical place about the lower end of the primary extension clamp and thereby move the pedal assembly in a longitudinal direction;

b) a pedal column extending upwardly from each of said pedal extension clamps, said pedal column having a first lower end and a second upper end, said first lower end being fixedly pivotally connected to said second upper end of said pedal extension clamp to permit the pedal column to pivot in the vertical plane about the second upper end of the pedal extension clamp and thereby move the pedal assembly in a longitudinal direction; and, c) a pedal U-fork extending upwardly from each of said pedal columns, said pedal U-fork having a first lower end and a second upper end, said first lower end fixedly connected to each of said second upper ends of the pedal column, said second upper end having a single member fixedly connected to said pedal assembly.

4. The apparatus of claim 3, wherein said means for connecting said forward end of said tongue member to said front wheel assembly comprises:

a) wherein said forward end of said tongue member has a steering pivot slot therein; and, b) wherein said steering pivot column is rotatably disposed in said steering pivot slot to permit connection of the rear main frame to the front wheel assembly.

5. The apparatus of claim 4, wherein said seat further comprises:

a) a seat frame clamp, said seat frame clamp being fixedly connected to said steering pivot column;

b) a generally horizontal seat frame having a bottom seat disposed thereon for receiving a user's buttocks, said seat frame having a first front end and a second rear end, said first front end of said seat frame being fixedly pivotally connected to said seat frame clamp to permit the rear end of the seat frame to pivot up and down;

c) a generally vertical back seat frame having a back seat disposed thereon to receive a user's back, said back seat frame having a first lower end and a second upper end; and, d) a pivoting joint pivotally connecting said second rear end of said seat frame and said first lower end of said back seat frame to permit the back seat frame to pivot with respect to the seat frame.

6. The apparatus of claim 5, wherein there are a pair of pivoting joints connecting said seat frame to said back seat frame.

7. The apparatus of claim 6, wherein said chain drive further comprises:

a) at least one sprocket disposed on said axle of said front wheel for cooperation with said pedal assembly wherein a chain drivingly connects said sprocket and said pedal assembly; and, b) a chain support arm having a chain guard and a pair of roller arms, said chain guard disposed adjacent to said roller arms, further a chain roller disposed on each of said roller arms to permit engagement and tightening of a chain by each of said chain rollers.

8. The apparatus of claim 7, further comprising means for movably mounting said bottom seat and said back seat whereby the bottom seat and the back seat are fixed together and are rotatably attached to the rear main axle to partially rotate in a vertical plane perpendicular to the longitudinal axis of the vehicle.

* * * * *